(12) United States Patent
Herrod

(10) Patent No.: US 8,336,080 B2
(45) Date of Patent: Dec. 18, 2012

(54) METHODS AND APPARATUS FOR RATING DEVICE SECURITY AND AUTOMATICALLY ASSESSING SECURITY COMPLIANCE

(75) Inventor: Allan Herrod, Mission Viejo, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 440 days.

(21) Appl. No.: 12/492,877

(22) Filed: Jun. 26, 2009

(65) Prior Publication Data
US 2010/0333166 A1 Dec. 30, 2010

(51) Int. Cl.
*G06F 17/00* (2006.01)
*G06F 11/00* (2006.01)
(52) U.S. Cl. ............... 726/1; 726/2; 713/166; 713/167; 455/3.01; 709/220; 709/224; 709/225
(58) Field of Classification Search .................. 726/1–2; 713/166–167; 455/3.01; 709/220, 224–225
See application file for complete search history.

(56) References Cited

U.S. PATENT DOCUMENTS

| | | | |
|---|---|---|---|
| 4,514,846 A | 4/1985 | Federico et al. | |
| 6,681,222 B2 | 1/2004 | Kabra et al. | |
| 6,763,517 B2 | 7/2004 | Hines | |
| 6,865,517 B2 | 3/2005 | Bantz et al. | |
| 6,892,317 B1 | 5/2005 | Sampath et al. | |
| 7,024,187 B2 | 4/2006 | Moles et al. | |
| 7,177,774 B1 * | 2/2007 | Brown et al. | 702/81 |
| 7,244,230 B2 | 7/2007 | Duggirala et al. | |
| 7,353,533 B2 | 4/2008 | Wright et al. | |
| 7,555,640 B2 | 6/2009 | Helvick | |
| 7,698,275 B2 | 4/2010 | O'Brien et al. | |
| 7,734,287 B2 | 6/2010 | Ying | |
| 7,787,863 B2 * | 8/2010 | van de Groenendaal | 455/411 |
| 7,913,290 B2 * | 3/2011 | Ohta et al. | 726/1 |

(Continued)

FOREIGN PATENT DOCUMENTS
EP 1655978 A1 5/2006
(Continued)

OTHER PUBLICATIONS
International Search Report and Written Opinion dated Oct. 14, 2010 in related case PCT/US2010/039928.
(Continued)

*Primary Examiner* — Yin-Chen Shaw

(57) ABSTRACT

Automatic Security Compliance Assessment (ASCA) systems and methods are provided for automatically generating and determining a security rating for a plurality of Settings Objects (SOs), where each of the SOs define particular configurations of subsystems of a wireless computing device. Each SO collectively defines a collection of Values specified for Configurable Attributes that can be used to define a different configuration for a particular subsystem associated with a particular Setting Class that is used to guide the creation of that particular SO. The server can store a group of security rating templates, each of which includes the information needed to determine an expected security rating for any SOs created per a particular Settings Class. For any combination of device settings, the resultant SOs can be used to generate an expected security rating. In addition, a security interaction template (SIT) and security test scripts can be generated that correspond to each particular group of SOs, and can be used to produce an Overall Device Security Rating (ODSR) for that particular group of SOs or a sub-set thereof.

18 Claims, 6 Drawing Sheets

U.S. PATENT DOCUMENTS

| | | | |
|---|---|---|---|
| 2002/0083164 A1 | 6/2002 | Katayama et al. | |
| 2002/0112041 A1 | 8/2002 | Viscount et al. | |
| 2004/0059920 A1* | 3/2004 | Godwin | 713/183 |
| 2004/0128583 A1 | 7/2004 | Lulo et al. | |
| 2004/0153841 A1 | 8/2004 | Beck | |
| 2004/0230835 A1* | 11/2004 | Goldfeder et al. | 713/201 |
| 2004/0260818 A1* | 12/2004 | Valois et al. | 709/229 |
| 2005/0102534 A1* | 5/2005 | Wong | 713/201 |
| 2005/0114625 A1* | 5/2005 | Snyder | 712/1 |
| 2005/0149564 A1 | 7/2005 | Jain et al. | |
| 2005/0197871 A1 | 9/2005 | Mendonca et al. | |
| 2005/0210331 A1 | 9/2005 | Connelly et al. | |
| 2005/0227683 A1 | 10/2005 | Draluk et al. | |
| 2006/0141428 A1 | 6/2006 | Herrod et al. | |
| 2006/0212771 A1 | 9/2006 | Fabbrocino | |
| 2007/0043525 A1* | 2/2007 | Brown et al. | 702/81 |
| 2007/0276859 A1 | 11/2007 | Aravamudan et al. | |
| 2008/0046786 A1 | 2/2008 | Patel et al. | |
| 2008/0047007 A1 | 2/2008 | Satkunanathan et al. | |
| 2008/0070495 A1* | 3/2008 | Stricklen et al. | 455/3.01 |
| 2008/0244691 A1 | 10/2008 | Hilerio et al. | |
| 2009/0024663 A1* | 1/2009 | McGovern | 707/104.1 |
| 2009/0204855 A1 | 8/2009 | Peters | |
| 2010/0112997 A1 | 5/2010 | Roundtree | |
| 2010/0138926 A1* | 6/2010 | Kashchenko et al. | 726/25 |

FOREIGN PATENT DOCUMENTS

| | | |
|---|---|---|
| WO | 2005029294 A1 | 3/2005 |

OTHER PUBLICATIONS

Final Office Action mailed Oct. 27, 2011, in U.S. Appl. No. 12/263,265, Allan Herrod filed Oct. 31, 2008 in related case.

Office Action mailed Mar. 7, 2011, in U.S. Appl. No. 12/263,265, Allan Herrod filed Oct. 31, 2008 in related case.

International Search Report and Written Opinion for International Application No. PCT/US2009/064507 mailed on Apr. 23, 2010 in related case.

Office Action mailed Dec. 17, 2010, in U.S. Appl. No. 12/276,799, Allan Herrod filed Nov. 24, 2008 in related case.

Final Office Action mailed Jul. 18, 2011, in U.S. Appl. No. 12/276,799, Allan Herrod filed Nov. 24, 2008 in related case.

International Preliminary Report on Patentability and Written Opinion for International application No. PCT/US2009/064507 mailed on May 24, 2011 in related case.

English language Abstract of European Patent Publication No. EP 0615188 (A1), European Patent Office, espacenet database—Worldwide (1994).

International Preliminary Report on Patentability and Written Opinion for counterpart International Application No. PCT/US2010/039928 mailed on Jan. 12, 2012.

Notice of Allowance mailed Jan. 30, 2012, in United States related U.S. Appl. No. 12/276,799, Allan Herrod filed Nov. 24, 2008.

Non Final Office Action mailed Dec. 30, 2011, in counterpart U.S. Appl. No. 12/551,285, Allan Herrod, Filed Aug. 31, 2009.

* cited by examiner

METHODS AND APPARATUS FOR RATING DEVICE SECURITY AND AUTOMATICALLY ASSESSING SECURITY COMPLIANCE

TECHNICAL FIELD

The present invention generally relates to enterprise networks that include enterprise computing devices, and more particularly relates to automatically determining security ratings of such enterprise computing devices and to automatically determining whether such enterprise computing devices comply with security standards and policies of the enterprise.

BACKGROUND

In recent years the use of cellular phones, smart phones, global positioning systems (GPS), personal data assistants (PDAs), laptop computers, and other such mobile units has increased dramatically. In any given enterprise, it is not uncommon for many thousands of mobile units to be present within the system. Extending business applications and data to mobile devices delivers a significant increase in employee productivity. It is therefore an expensive, time-consuming and critical task to administer large groups of mobile units, particularly when their use is important to day-to-day operation of the enterprise.

Recently companies have developed solutions that can allow network administrators to manage a group of enterprise mobile devices in a centralized manner, for instance, from a centralized Network Operations Center (NOC). For instance, Motorola, Inc. has developed a device management system called the Mobility Services Platform (MSP). MSP can dramatically reduce the time and cost associated with day-to-day management of mobile devices. Device management systems such as MSP can significantly reduce the time and cost required to manage a large number of mobile devices. This device management system can be used to manage hundreds of devices in a local site or tens or hundreds or thousands of mobile computers around the world from one centralized computer. Minimal hands-on time is required for staging of mobile devices for initial use, and ongoing provisioning and troubleshooting can be completely managed remotely via an anywhere and anytime web-based interface. Manual procedures are automated, eliminating errors. Among other things, MSP allows a network administrator to get devices up and running right out of the box, and ensures that devices are always loaded with the most current applications and operating system software. MSP enables a network administrator to constantly monitor and rapidly troubleshoot device issues to keep users up, running and productive.

For example, MSP offers advanced staging capabilities that provide the ability to configure network and device settings as well as load all operating systems and initial applications simply, easily, securely and remotely. Automated template-based configurations can be issued from a single point of control, enabling tens or hundreds or thousands of mobile devices around the world to be staged in minutes rather than months freeing up hundreds of hours (or more) previously spent on manual, error-prone efforts. Support for multiple device staging methods ensures one step simplicity for users, who can complete the staging by scanning a series of bar codes, performing an ActiveSync, docking the device in a cradle connected to a PC or computer network, or simply connecting to a pre-defined staging network.

Once mobile devices are up and running, MSP includes automated provisioning functionality to keep applications, device settings, operating systems and firmware on all mobile devices up to date with minimal effort or interaction from the end-user. Policy-based provisioning and over-the-air update capabilities can greatly reduce time and cost required to keep devices updated. Network administrators can keep devices updated by setting policies that define when mobile devices should upload their current status information (e.g., a complete inventory of all software on the device including applications as well as operating system information and device settings) to their associated relay server. Devices can be grouped by device type, type of user, operating system and location thereby providing the granular management capabilities needed to achieve maximum efficiency in the provisioning function.

The MSP also allows a network administrator to monitor and analyze mobile device statistics as well as troubleshoot and resolve day-to-day user issues regardless of whether those issues are related to the mobile device, applications or the wireless network. Historical and real-time metrics for the mobile device, as well as the network and the battery, enable proactive and real-time issue management that minimizes worker and mobile device downtime.

When deploying fleets of mobile devices within an enterprise, device security is increasingly a concern. Device security is of particular importance since mobile devices often reside on the extreme edge of the enterprise network and can therefore inadvertently provide a gateway into the enterprise. For instance, when an enterprise is dealing with especially sensitive data, such as payment information (e.g. credit and debit cardholder information) or medical information (e.g. patient information), the protection of that data is of paramount importance. Increasingly, applications that interact with such sensitive data are being mobilized in an effort to reduce costs and increase the quality and breadth of services provided. In such cases, the mobile device may become more than just an entry point into the enterprise network through which sensitive data could be accessed. The mobile device could become a repository for certain types of sensitive data. Even if sensitive data is never stored on the mobile device or is properly secured, such a mobile device is likely a participant in the exchange of such sensitive data. As such it becomes crucial that all aspects of the mobile device be thoroughly scrutinized as it relates to the protection of such data.

To help address potential security issues, mobile device management systems, such as MSP are increasingly becoming capable of configuring and managing the security configuration settings (or "security settings") of devices both initially and over time. MSP allows a network administrator to control security settings (or security configuration settings) of a device, and also allows a network administrator to take complete control of a device, for instance, in the event a device is misplaced or does not check in with MSP at the appropriate time. The administrator can remotely lock and unlock devices to help protect sensitive data.

Notwithstanding these advances it is desirable to provide systems that can help maintain security by making sure that existing security policies are consistently enforced. It is generally understood that the mobilization of applications that access sensitive information requires careful planning to ensure that sensitive data is protected. Unfortunately, the adequate protection of such data often requires collaboration between system and application components in a manner that is beyond the control of either the system or the application. In such cases, solutions can be and are being developed, but they tend to be custom solutions that are expensive to create and difficult to validate. In any such system, it is important, but can be difficult, to demonstrate conclusively that the solution provides the security demanded of it, both initially, at the time of deployment, and on a continuing basis once the solution is in production use.

Accordingly, it is desirable to provide improved systems and methods for ensuring that all of the devices in an enterprise network remain in compliance with the security policies or standards of an enterprise. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
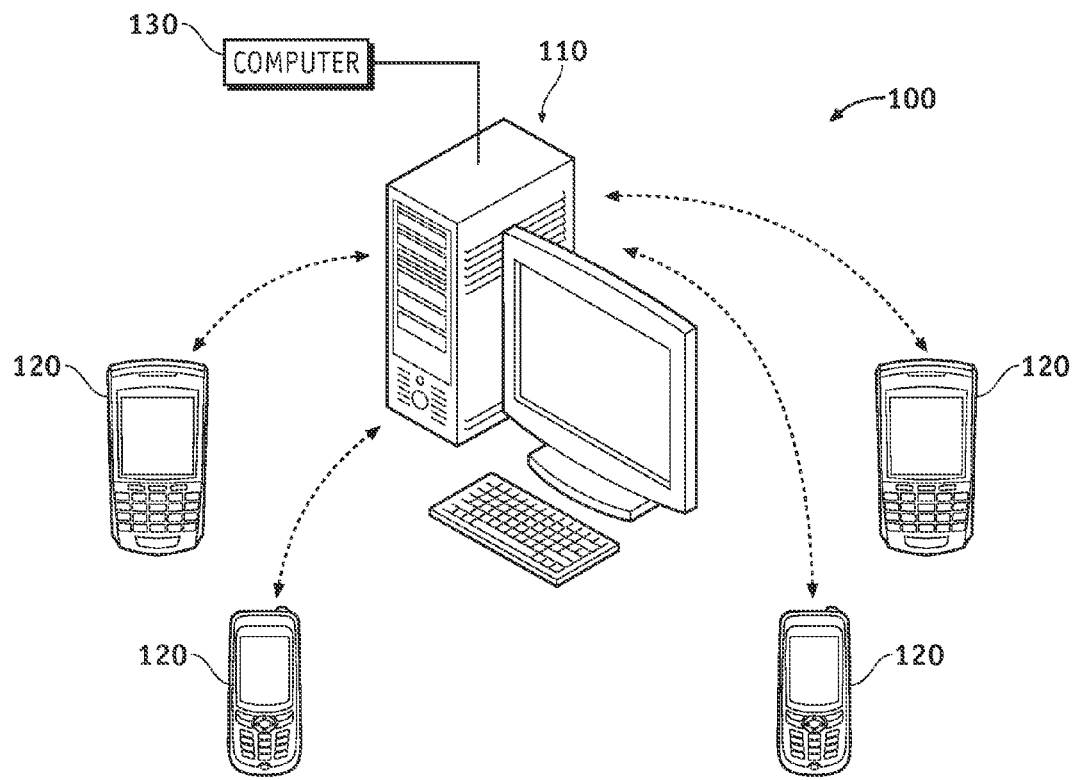
FIG. 1 is a block diagram of an exemplary system which can be used in accordance with the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to rating device security and automated security compliance assessment.

Overview

Embodiments of the present invention relate to a system and method for automatically determining whether all of the devices in an enterprise network comply with security policies or standards, and automatically taking remedial or corrective action to bring those devices into compliance with security policies or standards if they are determined not to be in compliance. These systems and methods can automatically ensure that all of the devices in an enterprise network remain in compliance with the security policies or standards, and automatically create records that establish whether each of the devices are in compliance and regularly update those records over time so that the enterprise can quickly and easily provide evidence of compliance and/or corrective actions taken to bring devices into compliance if required to do so.

In accordance with one embodiment a system is provided that includes a computer, and a "control" server in communication with the computer.

A plurality of different Settings Classes are defined for a first wireless computing device that has a number of subsystems (e.g., platform-related or application-related subsystems). The purpose of a Settings Class is to define how Settings Objects will be created. A single Settings Class has at least one Configurable Attribute and can have a determined based on one or more Options for that Configurable Attribute. Each Option defines or controls a Value that can/will be assigned (e.g., selected or entered) for each Configurable Attribute to configure a particular subsystem of the first wireless computing device. In other words, a Configurable Attribute defined in a Settings Class describes a Value that can/will be assigned by a user when a Settings Object is created from that Settings Class.

A Settings Object is an Instantiation of a Settings Class created by assigning Values to Configurable Attributes. Each particular subsystem is configurable by applying a Settings Object created in accordance with a particular one of the Settings Classes corresponding to that particular subsystem. Each Settings Object defines a specific configuration of a particular subsystem of the first wireless computing device. In particular, each Settings Object comprises a particular combination of Values of Configurable Attributes entered by the user or selected by the user from amongst the potential Values defined in the Options defined in the Settings Class and used to configure a particular subsystem corresponding to a particular Settings Class. There can be a large of Settings Objects created from a Settings Class because of the different Values that could be assigned to any one Configurable Attribute, the fact that not every Configurable Attribute needs to be assigned a value, and due to the possible combinations of Values assigned to all Configurable Attributes for one Settings Class. A user of the computer can specify a Value for each Configurable Attribute, as directed by the Options defined in the particular Settings Class, to specify a configuration for configuring the particular subsystem. When a Settings Object is created based on a Settings Class, the primary action is for the user to assign zero or one Value to each Configurable Attribute. The Values specified for each of the plurality of Configurable Attributes in each Settings Object collectively define a different configuration for the particular subsystem associated with the particular Setting Class used to guide the creation of that particular Settings Object.

The server can store a security rating template (generated by a security expert) for each particular Settings Class. Each security rating template comprises the information needed to determine an expected security rating for any Settings Objects created in accordance with a particular Settings Class. The "expected security rating of a Settings Object" is a rating of the security that would be expected to be exhibited by a device if a given Settings Object was applied on that device. Based on Values input by a user of the computer for a plurality of Configurable Attributes, the server can generate a first Settings Object for a first particular Settings Class. The first Settings Object comprises Values for particular Configurable Attributes of the first particular Settings Class that define a particular configuration of a first subsystem of the first wireless computing device. The server can use a particular security rating template corresponding to the first particular Settings Class to generate a first "expected" security rating corresponding to the first Settings Object. The security rating is "expected" (e.g., "predicted" or "estimated") since it is computed based on the knowledge and assumptions expressed in the particular security rating template by the HSE based solely on theory and principles expressed as rules provided by the HSE, and is not based on actual testing on the device.

The server can store the expected security rating in memory along with a time to indicate when the expected security rating was generated. The expected security rating can be displayed on a display of the computer to provide the user with feedback regarding the security that would result if that particular Settings Object were applied to configure a particular subsystem on the first wireless computing device.

In accordance with another embodiment, the user of the computer can input Values for a plurality of Settings Classes, and based on these Values, the server generates a plurality of other Settings Objects, where each of the other Settings Objects corresponds to one of the Settings Classes. The other Settings Objects each comprise other Values for particular Configurable Attributes of the particular Settings Classes. The other Settings Objects each define particular configurations of subsystems of the first wireless computing device. It is noted that it is not necessarily a requirement that there be only one Settings Object of a given Settings Class in a particular group. The other Settings Objects could be chosen to be of any Settings Classes including the First Settings Class.

For each of the other Settings Objects, the server can use a particular security rating template corresponding to each particular Settings Class to generate expected security ratings corresponding to each of the other Settings Objects. For sake of convenience, the first Settings Object and the other Settings Objects will be referred to below as a "particular group" of Settings Objects, where each of these Settings Objects corresponds to a particular Settings Class of the plurality of different Settings Classes for the first wireless computing device.

In accordance with one embodiment, a security expert can evaluate the particular group of Settings Objects generated by the user for the first wireless computing device and corresponding Security Rating Templates for each one of the particular group of Settings Objects to determine security inter-relationships between the configurations of subsystems represented by or defined by each one of the particular group of Settings Objects. The group of Settings Objects can include one Settings Object for each Settings Class, but does not necessarily need to in all cases (i.e., a group of Settings Objects can include one Settings Object for some of the Settings Classes). Based on this evaluation the security expert creates a security interaction template (SIT) and security test scripts that correspond to the particular group of Settings Objects. As used herein, the term Overall Device Security Rating (ODSR) refers to an overall security rating for a wireless computing device. As will be described below, depending on the context, there can be at least three different types of ODSRs that will be referred to herein as: an "expected" ODSR, an "actual" ODSR and a "verified" ODSR. The SIT describes how to produce an ODSR for the particular group of Settings Objects. The security test scripts correspond to the SIT and are generated by the security expert to identify the set of security test cases that may be run on the device to measure a verified ODSR that reflects the actual overall security exhibited by the device if the particular group of Settings Objects are actually deployed and actually applied as a group to the first wireless computing device.

Based on the security interaction template and the security rating templates, the server can generate a first expected ODSR that represents the aggregate security expected of the first wireless computing device if the particular group of Settings Objects are actually deployed and applied as a group to the first wireless computing device, taking into account the individual security ratings of the Settings Objects applied and the interactions between the Settings Objects applied. As used herein, the term "expected ODSR" refers to an ODSR that is "hypothetically determined or predicted" for an entire group of SOs. The expected ODSR for an entire group of Settings Objects (SOs) can be computed at a server, for example, using a SIT and SRTs that correspond to that entire group of SOs. The expected ODSR is hypothetical since it is not based SOs actually deployed and applied to a wireless computing device. In other words, the expected ODSR is calculated under the assumption that all Settings Objects in a group will be deployed and applied a wireless computing device and that the SIT and SRTs can accurately predict the security that the entire group of SOs would produce at the wireless computing device. As such, the expected ODSR can tell a user, such as a network administrator, the expected security if an entire group of SOs were to be applied to the wireless computing device. With the expected ODSR there is no guarantee that the expected security will necessarily be achieved, but it is useful for planning and prediction purposes without ever deploying anything to a wireless computing device The server can also generate, based on the security test scripts, a set of overall security test cases that could be run on subsystems of the first wireless computing device to measure the actual overall or aggregate security exhibited by the first wireless computing device if the particular group of Settings Objects are used together and actually deployed and applied as a group to the first wireless computing device.

The first expected ODSR is an aggregate rating that is determined based on individual security ratings of the particular group of Settings Objects when actually deployed and applied as a group to the first wireless computing device, using the security interaction template and taking into account the security impacts of the applied Settings Objects when interacting together. The first expected ODSR reflects resultant overall device security that the particular combination of Settings Objects would be expected to provide when subsystems of the first wireless computing device are configured in accordance with the particular group of Settings Objects. The first expected ODSR can be displayed to the user on the display of the computer to provide the user with an indication of the overall device security. In addition, the first expected ODSR can be stored in memory at the server along with a time to indicate when the first expected ODSR was generated.

The embodiments described above can be applied to generate, display and store a plurality of expected ODSRs, each of which could apply to a plurality of wireless computing devices. Once the expected ODSRs are determined, the same security can be expected if the corresponding Settings Object or corresponding collection of Settings Objects is applied to any device. This allows the work to be done once and then leveraged for an entire fleet of devices. In some applications, there may be parallel sub-fleets of devices and there may be different Settings Objects or collections of Settings Objects used to configure these different sub-fleets that are used for different purposes and hence require different configurations.

In accordance with yet another embodiment, an Automatic Security Compliance Assessment (ASCA) method and system are provided. The system includes a control server, a computer, and a wireless computing device communicatively coupled to the control server. The wireless computing device includes a number of configurable platform and application subsystems (hereinafter "subsystems"). Each particular subsystem is configurable by applying a Settings Object corresponding to that particular subsystem.

In response to Values input at the computer for a plurality of Configurable Attributes of the wireless computing device, the control server is designed to generate a plurality of Settings Objects each corresponding to a particular Settings Class of a plurality of different Settings Classes for the wireless computing device. The plurality of Settings Objects have an expected overall device security rating (ODSR) associated therewith. In addition, the control server generates a security interaction template (SIT) corresponding to the plurality of Settings Objects, and a security test script that include overall security test cases corresponding to the plurality of Settings Objects and the SIT.

The wireless computing device can include a Settings Objects application module, a Settings Objects verification module and an automated security assessment module.

When the Settings Objects application module receives the plurality of Settings Objects from the control server, it applies them (or at least some of them) to corresponding ones of the plurality of subsystems to configure those subsystems. The Settings Objects application module can create an application record that includes information regarding the plurality of Settings Objects. For each of the plurality of Settings Objects, the application record can include, for example, an identifier and version number for the particular Settings Object; an identifier for a particular one of the platform and application subsystems that corresponds to the particular Settings Object; an indicator that indicates whether application of that particular Settings Object to the particular one of the platform and application subsystems was successful; and if application of that particular Settings Object was successful, a time which indicates when that particular Settings Object was applied to the particular one of the platform and application subsystems. The application record can be stored in a settings log to create a historical record of current Setting Objects that are applied to the platform and application subsystems and when they were applied to the platform and application subsystems.

The Settings Objects verification module also receives the plurality of Settings Objects from the control server. In response, the Settings Objects verification module sends a request to the subsystems for the actual Settings Objects currently applied to the subsystems. The Settings Objects verification module then compares the actual Settings Objects currently applied to the subsystems to the plurality of Settings Objects to determine if the subsystems are configured as specified by the plurality of Settings Objects. For example, the Settings Objects verification module can determine if the subsystems are configured as specified by the plurality of Settings Objects by comparing the current actual Configurable Attributes and the corresponding Values for each of the current actual Configurable Attributes that are actually set on the subsystems to the Configurable Attributes to the corresponding Values for each of the Configurable Attributes that are specified by the plurality of Settings Objects. The subsystems will be configured as specified by the plurality of Settings Objects when the current actual Configurable Attributes and the corresponding Values for each of the current actual Configurable Attributes that are actually set on the subsystems match the Configurable Attributes and the corresponding Values for each of the Configurable Attributes that are specified by the plurality of Settings Objects.

The Settings Objects verification module can generate a configuration verification results record that includes an indicator of whether the platform and application subsystems are configured as specified by the plurality of Settings Objects. The configuration verification results record can be stored in the settings log to indicate whether the Attributes and corresponding Values specified by the plurality of Settings Objects match the actual Configurable Attributes and corresponding Values that are actually configured on the platform and application subsystems.

When the subsystems are determined to be configured as specified by the plurality of Settings Objects, the Settings Objects verification module generates a begin security assessment command. In response to the begin security assessment command, the automated security assessment module determines an Actual ODSR for the wireless computing device based on the SIT and the actual Settings Objects currently applied to the subsystems. The SIT includes rules for determining the actual ODSR when only a subset of the plurality of Settings Objects are currently applied to the subsystems and other ones of the plurality of Settings Objects are not currently applied to the subsystems. In many cases, when only some of the plurality of Settings Objects are currently applied to the subsystems the Actual ODSR for the wireless computing device is different than the expected ODSR.

Based on the actual Settings Objects currently applied to the subsystems, the automated security assessment module can determine relevant ones of the overall security test cases that are to be executed, and can execute them on the subsystems to compute a verified ODSR for the wireless computing device. In one implementation, the control server can compare the Actual ODSR or the verified ODSR to the expected ODSR to determine whether predicted or actual security of the wireless computing device matches expected security of the wireless computing device.

The automated security assessment module can generate a security assessment results record. The security assessment results record can include, for example, the Actual ODSR, the Verified ODSR, an indication of when the assessment took place, and an indication for each of the subsystems of whether that particular subsystem passed corresponding ones of the overall security test cases that were executed with respect to that particular subsystem. The security assessment results record can be stored in a security assessment log that can be maintained at the control server.

Based on the security assessment results, the automated security assessment module can determine that the wireless computing device fails security assessment and does not meet the security policies. This can happen, for example, when one or more of the subsystems fails one of the overall security test cases, or when the Actual of Verified ODSR for the wireless computing device is less than the expected ODSR. When the wireless computing device fails security assessment and does not meet the requisite security, the automated security assessment module can generate a security failure notification message and a rejection indicator to indicate that the actual Configurable Attributes and corresponding Values being applied to the subsystems do not meet security policies.

In response to receiving the rejection indicator, the Settings Objects verification module can then determine if the subsystems are configured as specified by the plurality of Settings Objects by re-comparing the current actual Configurable Attributes (and the corresponding Values for each) that are actually set on the subsystems to the Configurable Attributes (and the corresponding Values for each) that are specified by the plurality of Settings Objects.

When the subsystems are not configured as specified by the plurality of Settings Objects, the Settings Objects verification module can send a reapply command to the Settings Objects application module to reapply the plurality of Settings Objects to the subsystems to make sure that the actual Configurable Attributes and corresponding Values that are set on each of the subsystems match those specified by the plurality of Settings Objects. The Settings Objects verification module can then generate a new security assessment results record that can be stored in the security assessment log.

FIG. 1 is a block diagram of an exemplary system 100 which can be used in accordance with the disclosed embodiments. The system 100 includes a control server 110 configured to communicate with a plurality of wireless computing devices 120 (e.g., wirelessly or through a wired connection or using one or more intermediate switches, routers, relay servers, access points, or the like).

Although not illustrated, it will be understood that each wireless computing device 120 generally includes one or more processors (e.g., microprocessor or microcontroller), one or more storage components (e.g., RAM, ROM, disk storage, etc.), a user interface 102, and an I/O module, all suitably interconnected via a bus or other connection means. The processor is configured to carry out software and/or firmware instructions stored within the storage component, in the conventional manner, while interfacing with the user interface and I/O module. Depending upon the type of wireless computing device, the user interface may include any combination of hardware and software components configured to provide an interface with a human user, including, but not limited to, touch screens (e.g., capacitive and resistive screens), keyboards, buttons, dials, displays (e.g., LCDs, LEDs, etc.), and the like.

Wireless computing devices 120 may be configured to communicate via WLAN protocols (IEEE 802.11 protocols), IrDA (infrared), Bluetooth, ZigBee (and other variants of the IEEE 802.15 protocol), IEEE 802.16 (WiMAX or any other variation), Direct Sequence Spread Spectrum, Frequency Hopping Spread Spectrum, cellular/wireless/cordless telecommunication protocols (e.g., 3G), wireless home network communication protocols, paging network protocols, GPS, magnetic induction, satellite data communication protocols, wireless hospital or health care facility network protocols such as those operating in the WMTS bands, GPRS, and proprietary wireless data communication protocols such as variants of Wireless USB.

Wireless computing devices 120 may take a variety of forms and have any desired physical dimensions. For example, wireless computing devices 120 may be a cellular phone, PDA, an RFID reader, or the like, or may be a conventional laptop, sub-notebook, or notebook.

Control server (or simply "server") 110 includes any combination of hardware and software capable of carrying out the functions described herein. In that regard, server 110 may also include various networking components, databases, consoles, etc., which, for the sake of clarity, are not illustrated in the figures. In one embodiment, for example, server 110 corresponds to one of the various Mobility Service Platform (MSP) servers provided by Motorola, Inc. In one implementation, the server 110 resides at a Network Operations Center (NOC) and communicates with devices 120 via one or more Relay Servers (not illustrated) which are used to relay information to and from devices 120 being managed by server.

Although not illustrated in FIG. 1, the control server 110 includes a module that communicates with a device agent module (not illustrated) on each of the devices 120. The control server 110 makes high level decisions, deploys executable code and data to the device agent modules as needed, collects results, generates reports of the results, and determines future action that are required. The device agent module analyzes actual real-time conditions on the device, based on previously deployed information from the control server, performs local remediation and logging, and sends periodic updates to the control server for tracking, forensic, and future planning purposes.

In one implementation, the control server sends executable code and data to the devices to define information needed and to implement the logic to make an assessment. In this implementation, executable code to implement the device-side functionality can be deployed via Control Module Packages that contain executable code, and data can be deployed in the form of Settings Objects which are encoded as data files that are embedded in Settings Packages for deployment.

A Control Module Package can be used to deploy a Control Module that then represents a new "subsystem" that can be configured by Settings Objects of a Settings Class designed specifically to configure that subsystem. Once the Control Module Package is deployed, then Settings Packages can be deployed that configure the operation of that Control Module. The data needed by the device-side code (templates, test cases, etc.) can be delivered as Values of Configurable Attributes of Settings Objects that conform to the Setting Class defined to represent the configuration of that new Control Module. Details of Setting Objects are described below.

Configuration of Devices

Enterprise wireless computing devices 120 have a number of platform subsystems and application subsystems. Some (or possibly all) of these subsystems are configurable, meaning that a subsystem has a plurality attributes that can be configured (hereinafter referred to as "Configurable Attributes.") For a particular subsystem, a Settings Class (SC) generically defines a plurality (e.g., group or set) of related configurable attributes for a particular subsystem that can be configured and applied to that particular subsystem. A Settings Class can define individual Configurable Attributes to be optional or required. For some Settings Classes, a single Configurable Attribute might be all that might be required.

Each Configurable Attribute of a Settings Class can define a plurality of Options that may be available when configuring a particular subsystem. For some Configurable Attributes a Settings Class can specify via an Option that a Value is to be entered or selected for a Configurable Attribute. A Value is a specific entry or selection assigned to the Configurable Attribute. When a Settings Class defines that a Value is to be selected for an Attribute, the Settings Class supplies a plurality of possible Values from which the user can select. The Values and Options for each Configurable Attribute are all defined as part of the Settings Class (SC) that represents the particular subsystem to be configured.

An Option describes the nature of the Value that will be assigned for that Configurable Attribute and/or how it will be assigned. Options can be used to specify configuration choices available to users for configuring Configurable Attributes, and can allow a user to choose from a set of available choices for configuring a given subsystem. Depending on the choice made for the Value of one Configurable Attribute, other related Configurable Attributes may need to be supplied as well. To explain further, Configurable Attributes can be "related" meaning that the existence or Value of one may control or constrain the existence or Value of another. For example, a Passphrase is generally only allowed to be entered when an Encryption type that requires a Passphrase is selected.

There are many different types of Options that can be specified for a Configurable Attribute, and a single Configurable Attribute can have multiple Options.

For any one Configurable Attribute, one type of Option indicates whether a Value is mandatory or not by specifying whether it is Required or Optional. Whether a Value is Required or is Optional is defined by the Options for that Configurable Attribute defined in the Settings Class. This Option allows the Settings Class to control, for each Configurable Attribute, whether the user is Required to assign a Value to that Configurable Attribute or whether assigning a Value to that Configurable Attribute is Optional and at the discretion of the user.

Another type of Option for a Configurable Attribute indicates how a Value should be assigned. A Value can be Entered or Selected, and whether the Value is Entered or Selected is defined by an Option for that Configurable Attribute defined in the Settings Class. As such, this type of Option specifies how a user should enter or select a Value for its corresponding Configurable Attribute. This Option allows the Settings Class to control, for each Configurable Attribute, the method that a user will follow to assign a Value to that Configurable Attribute, if the user does so. If this Option indicates that a Value is to be Entered, then the user will type in a Value. If this Option indicates that a Value is to be Selected, then a list of Potential Values will also be provided as part of the Settings Class and the user will pick a Value from a list of Potential Values provided as part of the Option itself. In many cases both types of Options are combined for a given Configurable Attribute. For instance, a single Configurable Attribute might be Optional and Entered, which means that a user can choose whether to assign a Value for that Configurable Attribute, but if they do choose to assign a Value, they will do so by typing in the Value. As another example, a single Configurable Attribute might be Required and Selected, which means that a user must assign a Value for that Configurable Attribute. The user will be presented with a list of Potential Values (defined as part of the Option), and will be required to select a Value from the list of Potential Values.

When a user (e.g. administrator) decides to configure a device 120, the user can access a console User Interface (UI) of the server 110 by launching the console UI from a web browser running on a computer 130. To define settings for a particular subsystem and configure a wireless computing device 120, the user can either select a Settings Class from a list of available Settings Classes or create a new Settings Class by uploading XML files that define the Settings Class to the server 110. Each Setting Class corresponds to a particular subsystem on the device 120. Each Settings Class contains the rules for directing the user to enter/select Values for various Configurable attributes through the console UI presented on computer 130 via the web browser. The user is guided to provide Values for some or all of the Configurable Attributes defined by the Settings Class by the Options specified in the Settings Class for each Configurable Attribute. Once Values are entered/selected for all required/desired attributes, a Settings Object containing those Values is saved under a unique name in a library of the server 110.

As used herein the term "Settings Object (SO)" refers to an object generated as a result of a user entering a collection/set/group of Values for Configurable Attributes that are consistent with the Options defined by a Settings Class. A Settings Object (SO) includes the encoding of the choices made by the user in accordance with a specific Settings Class. The range of scope of a Settings Object is defined by the Settings Class. There is a one-to-many relationship between a Settings Class and Settings Objects, since a Settings Object is an instantiation of a Settings Class. In some cases, the number of Settings Objects generated as a result of a single Settings Class can be very large.

When a Settings Object is deployed to a device, a Settings Plug-In on the device, which has a one-to-one correspondence with the Settings Class, is called to actually apply the Settings contained within the Settings Object to a particular subsystem (for a specific Settings Class) on the device to configure that particular subsystem. The Settings Object represents an actual configuration that can be applied to that particular subsystem of the device. In other words, a specific configuration of a particular subsystem on the device will be defined when a user selects particular Values for particular configurable attributes of a Settings Class. Using staging (initial deployment) or provisioning (ongoing deployment), devices can be configured by applying Settings Objects from the library to them. The same Settings Objects is often applied to a collection of devices to ensure that they are all configured the same.

As will be described in detail below, the disclosed embodiments can provide techniques and technologies that provide the user with an idea of how secure his device will be if he deploys one or more Settings Object to it by leveraging knowledge of a human security expert (HSE).

The HSE can create security rating templates (SRTs) for each Settings Class. As used herein the term "security rating template (SRT)" refers to a template that can be used to determine a security rating of any Settings Object created in accordance with that Settings Class. A SRT is created by the HSE to capture his knowledge about the potential security of a Settings Class, and the possible security implications of different configurations for the subsystem that can be produced by different choices made when creating Settings Objects in accordance with that particular Setting Class. An SRT provides the information needed to generate a Security Rating for any Settings Object created in accordance with its associated Settings Class. As used herein the term "security rating (SR)" refers to a rating of the security of a particular Settings Object that would be expected to be exhibited if that Settings Object were applied to a device. As noted above, when a user enters/inputs a new combination of Values for Configurable Attributes defined by a Settings Class, a Settings Object is generated. The SRT for that Setting Class will produce a security rating (SR) for that combination of Values. Hence, depending on the choices the user makes, the SR for each Settings Object can be different. For example, choosing "Open" for "Encryption" will result is a significantly less secure (perhaps totally unsecure) system compared to choosing "WPA-PSK."

The HSE creates one SRT per Settings Class. For a given Settings Class the corresponding SRT identifies how the choices made by a user when creating a Settings Object in accordance with that Settings Class will impact the security. To create an SRT, the HSE generalizes and parameterizes the security implications of the various Attributes of a Settings Class. By doing this properly, it is possible to formulaically render the Security Rating for any Settings Object created from that Settings Class. An SRT can be used over and over by the system any time it encounters a new combination of Values for Attributes defined by a Settings Class, and needs to determine a security rating for that combination of Values for Attributes.

Given an SRT, the user can find out how secure a Settings Object (created by anyone) would be expected to be, without deploying it to any device. In one implementation, the user can view the security rating of any Settings Object at any time as long as an SRT for the Settings Class used to create that Settings Object is stored in a library on the server 110. In another implementation, the security rating of a Settings Object can be displayed as it is being created, so the user creating it can direct his choices towards achieving an acceptable level of security.

Now, a user will create or have access to a plurality of Setting Objects. For a particular selection or group of Settings Objects, the HSE describes relationships in a Security Interaction Template (SIT).

As used herein the term "security interaction template (SIT)" refers to a template generated by an HSE that describes how to produce an overall device security rating. As noted above, the term Overall Device Security Rating (ODSR) refers to an overall security rating for a wireless computing device, and depending on the context, the ODSR can be either an "expected" ODSR, an "actual" ODSR or a "verified" ODSR. As will be described in greater detail below, the actual ODSR is a security rating for a group of Settings Objects, and it provides an overall assessment to indicate how secure the device actually would be if that particular group of Settings Objects were applied to subsystems of the device. The overall device security rating that is produced changes depending on which combination of Settings Objects are applied on a device. For example, if a VPN Settings Object is combined with a WWAN Settings Object, a very different (and more secure) result is likely to occur than if the WWAN Settings Object is used separately.

To generate an SIT, the HSE needs to be fully aware of the Settings Classes for the Settings Objects and the SRT for each Settings Class. The HSE also needs to have enough understanding of the security implications of each so that the HSE can reasonably evaluate interactions between them. The HSE then needs to consider generally how the domains of those Settings Classes potentially overlap and the impact of any such overlap on overall security. An SIT encapsulates an HSE's knowledge about the aggregate effect of applying multiple Settings Objects to a single device. Given collection of SITs, a non-HSE can see the composite security that would result from applying common combinations of Settings Objects to a device. This helps with planning for security policy compliance since it allows the user to choose a combination that can be expected to meet specific security requirements.

As used herein, the term "actual ODSR" refers to an ODSR that is predicted for either an entire group of SOs or a subset of that entire group of SOs based SOs actually deployed and applied to the wireless computing device. The actual ODSR can be computed at the wireless computing device using a SIT and SRTs that correspond to that entire group of SOs, in view of the SOs that are actually deployed and applied to the wireless computing device. Although the actual ODSR is still predicted, in comparison to the expected ODSR, it is more accurate (in most cases) since it is determined based on better information (i.e., based on knowledge of which ones of the SOs have actually been deployed and applied to the wireless computing device). The actual ODSR is useful for compliance cross-checking since it allows a user to easily determine that all devices should be in compliance with some minimum security settings, and should therefore exhibit the security planned by the network administrator assuming his plan works as expected.

Once a combination of Settings Objects has been deployed to a device, one would reasonably expect the device to exhibit the security rating computed by the SIT until the configuration of the device is intentionally changed. However, a number of things could go wrong. For example, all Settings Objects may not have been deployed, one or more Settings Objects that were deployed may not be properly applied, the actual security characteristics exhibited by one or more Settings Object are different than predicted by the HSE, the actual interactions between Settings Objects are different than predicted by the HSE, or changes may have been to the configuration of one or more subsystems since the Settings Objects were applied that cause the security to be impacted.

To help address such problems, the HSE can also create "security test scripts (STSs)." A STS refers to a set of security test cases (STCs) that can be run in a particular sequence on a device's subsystems to compute a "verified ODSR" that can be used verify/measure the actual security of the device in view of the Settings Objects that are currently applied on the device. As used herein, the term "verified ODSR" refers to an ODSR that is actually determined by running test cases specified in the SIT on the wireless computing device to determine the actual security that the wireless computing device will exhibit during use. The verified ODSR is neither hypothetical or predicted, but represents the actual verified security that the wireless computing device will exhibit during use. In many cases, the verified ODSR can be computed at the wireless computing device using the SIT that corresponds to that entire group of SOs. The verified ODSR is "verified" since it is based on actual testing of the wireless computing device that has had a group or subset of a group of SOs deployed and applied to the wireless computing device. The verified ODSR provides a measure of actual device security given the wireless computing device's current settings, and lets the user know whether the wireless computing device is actually as secure in real use as predicted by the actual ODSR Thus, the STCs can be used to verify the degree to which the intended or target security that is expected is actually being exhibited on a device. An HSE defines STCs based on the actual choices made by the user(s) who created the Settings Objects. If all the Settings Objects are applied on a device, all STCs in the STS should be run. If only some Settings Objects are applied on the device, only relevant STCs in the STS should be run. By performing STCs initially, the system can determine if the expected results are actually achieved by applying the selected Settings Objects. By performing STCs periodically, changes over time can be identified that may impact the actual ongoing security of the device.

These features and others can be implemented as part of an Automatic Security Compliance Assessment (ASCA) system that will be described more fully below with reference to FIGS. 2-4D. This ASCA system can be used to implement a plan that has policies that call for a specific degree of security. Among other features, the ASCA system can provide evidence that the plan was put into action as intended and evidence that the plan resulted in the required degree of security. The ASCA system can also detect and report any deviation from the required degree of security, and can optionally detect deviations from the required degree of security and automatically restore the required degree of security by reapplying Settings Objects to repair such deviations when they occur.

In the following description of FIGS. 2-4D, example embodiments of the invention will be described where those embodiments are applied in the context of assessing security settings of a wireless communication device to determine compliance with security standards and policies of an enterprise. However, those skilled in the art, will appreciate that the various embodiments can also be applied in other contexts for assessing other device settings such as bandwidth usage, memory utilization, or any other device settings that could be estimated in terms of the impact likely to result on the device from applying one or more configurations to one or more subsystems. As such, the invention should not be construed as being limited to assessing security settings of a wireless communication device to determine compliance with security standards and policies of an enterprise, and it should be understood that "security compliance assessment" is only one example application of the various embodiments described below with reference to FIGS. 2-4D.

Figure 2:
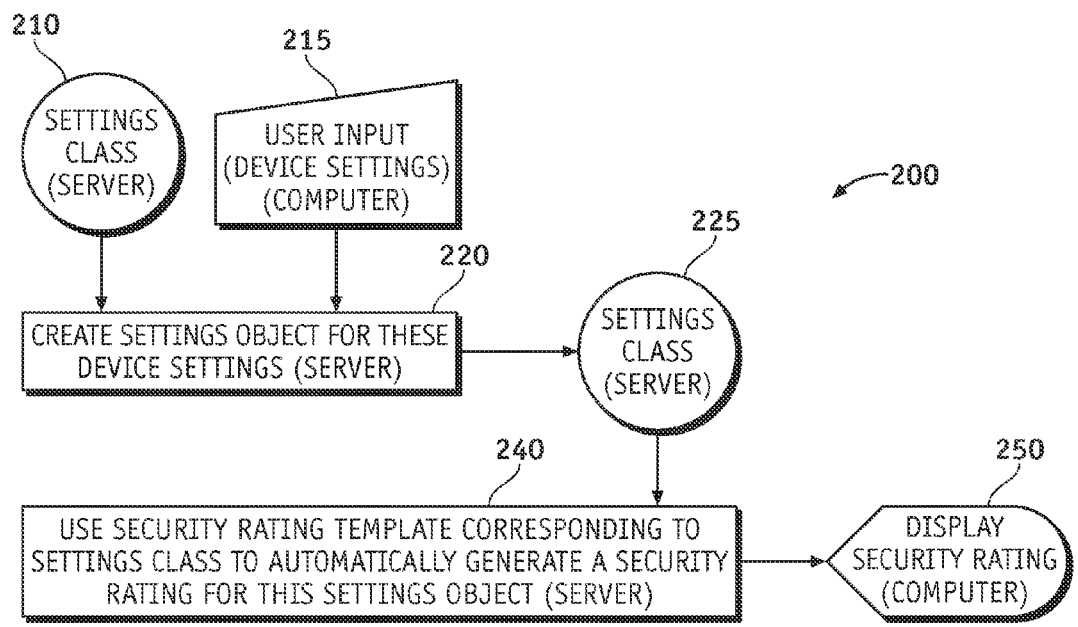
FIG. 2 is a block diagram that illustrates a security class rating system for automatically generating a security rating corresponding to a set of Values for Configurable Attributes for a Settings Class and displaying the security rating in accordance with some of the disclosed embodiments.

FIG. 2 is a block diagram that illustrates a security class rating system 200 for automatically generating a security rating 245 corresponding to a set of Values for Configurable Attributes for a Settings Class and displaying the security rating 245 in accordance with some of the disclosed embodiments. System 200 can be implemented at a control server 110 communicating with a remote computer 130. Using input provided by a user of the computer 130, the control server 110 can use this processing illustrated to generate a Settings Object along with a corresponding security rating that is communicated to the computer 130 and displayed to the user. In this embodiment, the processing takes place at the control server 110 as controlled from the Console UI at computer 130 by the user so that when the user creates a Settings Object 225 the user is provided with a corresponding Security Rating of that Settings Object 225. In an alternative embodiment, a device 120 can be provided with Security Rating Templates for each corresponding Settings Class and can assess the security rating of a specific Settings Object when a user of the device inputs Values for Configurable Attributes for a particular Settings Class FIG. 2 will be described with reference to generating a security rating 245 for a particular Settings Object 225 for a particular Settings Class 210; however, it is to be appreciated that for a given device there can be many different Settings Classes, many different Settings Objects 225 for each of the different Settings Classes, and hence many different security ratings 245 for each of the different Settings Classes (i.e., one security rating for each possible Settings Object). Settings Classes are described in detail above. For a particular device there can be multiple Settings Classes, where each Settings Class can define any number of different Configurable Attributes, and each Configurable Attribute can have any Options defining how the user will supply a Value for that Configurable Attribute. Some Configurable Attributes require that a Value to be entered by the user, while others allow the user to select a Value from amongst a set of possible Values, whereas other Configurable Attributes allow the user to enter a Value. Some example Settings Classes are: Network.WLAN.FusionPublic, which configures network settings for WiFi adapters running the Fusion radio stack; Network.WWAN.GPRS, which configures network settings for cellular modems using GPRS technology; and Clock.DateAndTime, which configures the date, time, and time zone of the real-time-clock of a device. Examples of configurable attributes include, for example, Encryption, ESSID, Authentication, Passphrase, Access Point name, user name, password, time zone, etc. The Network.VLAN.FusionPublic Settings class defines Attributes including, for example, "Encryption" and "ESSID." The Encryption attribute defines the type of network encryption to be used over the air between the device and an access point, and the ESSID attribute defines the identifying string for the network to which the device should connect. The Options for the Encryption attribute requires the user to select a value from a list including "Open", "WEP", "TKIP", "AES", etc. The Options for the ESSID attribute require the string value to be entered by the user.

Although not illustrated, it is noted that a human security expert uses their "expert knowledge" of security mechanisms being used within the system and common security issues with respect to mobilized applications to identify and evaluate key security factors for each Settings Class 210 that can affect security of that Settings Class 210. The human security expert assesses standard device configurations, and evaluates (according to an objective rating system created by the expert) all the aspects of a standard configuration that could be applied to one or more mobile devices in terms of the security that would be expected if that configuration were applied to one or more devices. For each possible Settings Class, the human security expert can create a corresponding security rating template. The security rating templates are created in advance of using the system 200 so that when a user of the computer 130 inputs a particular combination of Values for Attributes and for a particular Settings Class 210 to generate a Settings Object 225, the server 110 will automatically generate a corresponding security rating for that Settings Object 225. To explain further, for each Settings Class 210, the human security expert creates a security rating template for that particular Settings Class 210 that can be used to generate a security rating for each possible Settings Object 225 in that Settings Class 210. Significantly, the human security expert only needs to generate a security rating template one time for each Settings Class, and it can then be used whenever it is necessary to generate a security rating for a particular Settings Object created in accordance with that Settings Class.

At block 210, a user of computer 130 selects a particular Settings Class 210. The user can be, for example, a network administrator or other administrative user, and in some cases could even be the user of the device if they are provided with access to the server 110. The Settings Class 210 selected controls what subsystem of a device will be configured and guides the entry of the relevant settings for that subsystem that are input by the user at block 215. At block 215, the user inputs (e.g., sets or enters) specific device settings (i.e., as represented by Attributes and Options for those Attributes) for the particular Settings Class selected at block 210.

At block 220, the server 110 automatically generates a particular Settings Object 225 based on the user input 215 for the particular Settings Class 210, and sends the particular Settings Object 225 to an automated object security rating block (not illustrated) that can be implemented at the control server 110. The Settings Object 225 is an actual collection or group of device settings for a particular Settings Class 210, and defines a specific configuration of a selected Platform-related Subsystem or Application-related Subsystem of the device. The group of device settings that can be applied to the device is configurable and can be set by the user. Device settings applied to a given device are not always static or the same; rather, the user can change the particular device settings that are selected and each time the device settings are changed a different Settings Object is defined that corresponds to that particular group of device settings.

For instance, for Settings Class #1 a user could enter different Values for Attribute #1, choose to enter or not enter a Value Attribute #2, select a variety of Values for Attribute #3 and a Settings Object 225-1 would be generated for that combination of device settings. Likewise, for Settings Class #n the user could select a variety of Values from among the available Values for Attribute #1, and a Settings Object 225-n would be generated for that device setting.

It should be noted that the Settings Object 225 may be created long before it is ever deployed to and applied on a device. This way the user of the computer 130 can view the Security Rating of that Settings Object and have a general idea of the security impact that Settings Object will have on a device 120 if it is deployed.

At block 240, the server 110 uses the security rating template corresponding to the Settings Object 225 to automatically generate a security rating for the Settings Object 225. The security rating for that Settings Object 225 is automatically determined via the security rating template for its corresponding Settings Class.

At block 250, the security rating for the Settings Object can be displayed on a display of the computer 130 (or alternatively at a Console UI of the control server or other monitoring station) so that the security rating of the Settings Object 225 is viewable. When the security rating is displayed to the user, the user can understand how secure their user input 215 choices were. If the user finds the security rating unacceptably low, then the user can change one or more of the device settings to try and improve the security rating for that particular Settings Object. Each time the user inputs (enters or selects) a new combination of device settings, a new Settings Object will be generated that has its own corresponding security rating. Although not illustrated, the security rating for the Settings Object is logged and stored in memory for future use.

Although FIG. 2 illustrates automatic generation of a single security rating corresponding to a single Settings Object 225, it is to be appreciated that method 200 can be repeated automatic generation of other security ratings corresponding to other Settings Objects. When the user creates multiple Settings Objects, the Security Rating of each Settings Object 225 can be stored at the server 110 so that the user can view the Security Rating of previously created Settings Objects. Moreover, the method 200 can be applied to different Settings Classes to generate corresponding security ratings for the Settings Objects that correspond to each of the different Settings Classes.

As will be described with reference to FIG. 3, for a given device all of its security ratings (for each of its Settings Objects that correspond to each of the different Settings Classes available for that device) can be combined to generate a "rolled-up" or overall device security rating for the combination of Settings Objects. This rolled-up or overall device security rating takes into account all of the device settings across all of the different Settings Classes. This is important because in some cases different device settings can interact and have either a constructive/synergistic impact on overall device security or destructive impact on overall device security.

Figure 3:
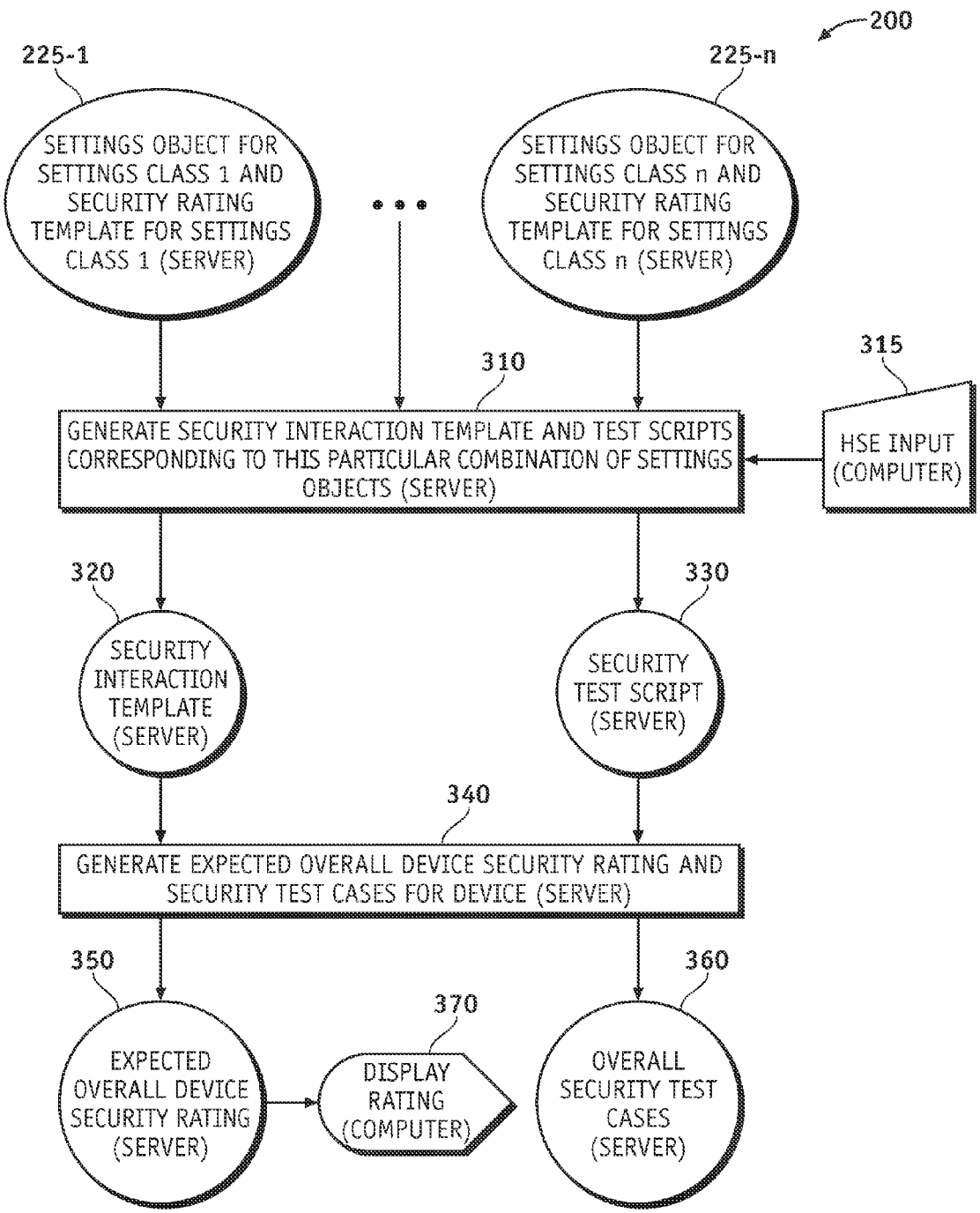
FIG. 3 is a block diagram that illustrates a system for generating and displaying an expected overall device security rating (ODSR) for a set of Settings Objects and for generating overall security test cases for the set of Settings Objects in accordance with some of the disclosed embodiments in accordance with some of the disclosed embodiments.

FIG. 3 is a block diagram that illustrates a system 300 for generating and displaying an expected overall device security rating (ODSR) 350 for a set of Settings Objects 225-1 . . . 225-n and for generating overall security test cases 360 for the set of Settings Objects 225-1 . . . 225-n in accordance with some of the disclosed embodiments. System 300 can be implemented at a control server 110 communicating with a computer 130, where a group of Settings Objects are generated by a user at the computer 130 that is in communication with the control server 110.

At block 310, the particular set of Settings Objects 225-1 . . . 225-n of various Settings Classes and their corresponding security rating templates are evaluated by a HSE 315 to generate a corresponding security interaction template 320 and corresponding security test scripts 330. The human security expert evaluates a set or collection of Settings Objects 225-1 . . . 225-n to determine the security interrelationships between them and to identify interconnections and relationships between combinations of security mechanisms that could add to (or potentially detract from) the overall security of the platform. One example of a Settings Class might be a Wireless Local Area Network (WLAN) Settings Class that specifies how a mobile device is configured to gain network access. Another example might be Virtual Private Network (VPN) Settings Class used to specify credentials and digital certificates installed on a device to further secure network access. In this case, adding a VPN to a system using a WLAN connection would generally enhance the overall security of that system, whereas adding a Wireless WAN connection to a system using a WLAN connection might reduce the overall security of the system.

The security interaction template 320 is defined for the particular combination of Settings Objects 225-1 . . . 225-n of various Settings Classes. The security interaction template 320 can be used to compute an Overall Device Security Rating (ODSR) for a set of Settings Objects 225-1 . . . 225-n of various Settings Classes. This ODSR is an aggregate rating that takes into account how all of the different Settings Objects are expected by the HSE to interact together and the resultant device security they will provide when operating in combination together. In one embodiment, the SIT 320 can be generated by evaluating the Security Ratings assigned to each of Settings Objects 225-1 . . . 225-n (by applying the SRTs) in terms of the expected interactions between them with reference to the Settings Classes. For example, the HSE would know that when WWAN and VPN Settings Objects are used together, the combined security rating is the higher of the two. But when a WLAN and WWAN Settings Objects are used together, the combined security rating is the lower of the two. This would often involve decisions by the HSE as to the relationships between the subsystems configured by the Settings Objects and their impact on security. If the HSE determines that a given Settings Object itself has no impact on security, then it can reasonably be concluded that it will have no impact on security when applied together with other Settings Objects and hence has no security interactions to be noted. If the HSE determines that subsystems do not overlap or interact in any way that impacts security, then there will be no security interactions to be noted amongst Settings Objects used to configure them. If the HSE determines that subsystems overlap or interact in ways that impact security, then appropriate security interactions would be noted. The interactions noted would often lead the HSE to determine that the combined security rating should be the best or worst security of any Settings Objects being applied.

The security test scripts 330 specify overall security test cases 360 that can be run on the device 120 (per the human security expert's opinion) to verify the overall security of a particular combination of Settings Objects 225-1 . . . 225-n that the user of the computer 130 has selected if they are applied to the device so that the user could determine how good their device security would actually be in the real world after applying the particular combination or group of Settings Objects 225-1 . . . 225-n to the device 120.

The security interaction template 320 and corresponding security test scripts 330 can be stored at the control server 110 for future use as will be described below. The evaluation performed by the HSE can be performed a number of different ways that, for sake of clarity, will be described below following the description of FIG. 3.

At block 340, an expected ODSR 350 for the device is generated based on the particular security interaction template 320, and overall security test cases 360 are generated based on the particular security test scripts 330 generated at block 310. At Block 340, the server 110 automatically evaluates the relative security that the set or group of Settings Objects 225-1 . . . 225-n would produce if applied to the device given the security impacts of those Settings Objects 225-1 . . . 225-n and their potential interactions. When all the Settings Objects 225-1 to 225-n are applied on a device, the SIT 320 would always result in the same expected ODSR. The expected ODSR 350 is the ODSR expected for a device if all those Settings Objects are actually applied. In other words, the expected ODSR 350 computed at block 340 is based on the assumption that all of the Settings Objects 225-1 . . . 225-n are used together. If all the Settings Objects 225-1 to 225-n are applied on a device, all tests should be run.

Figure 4A:
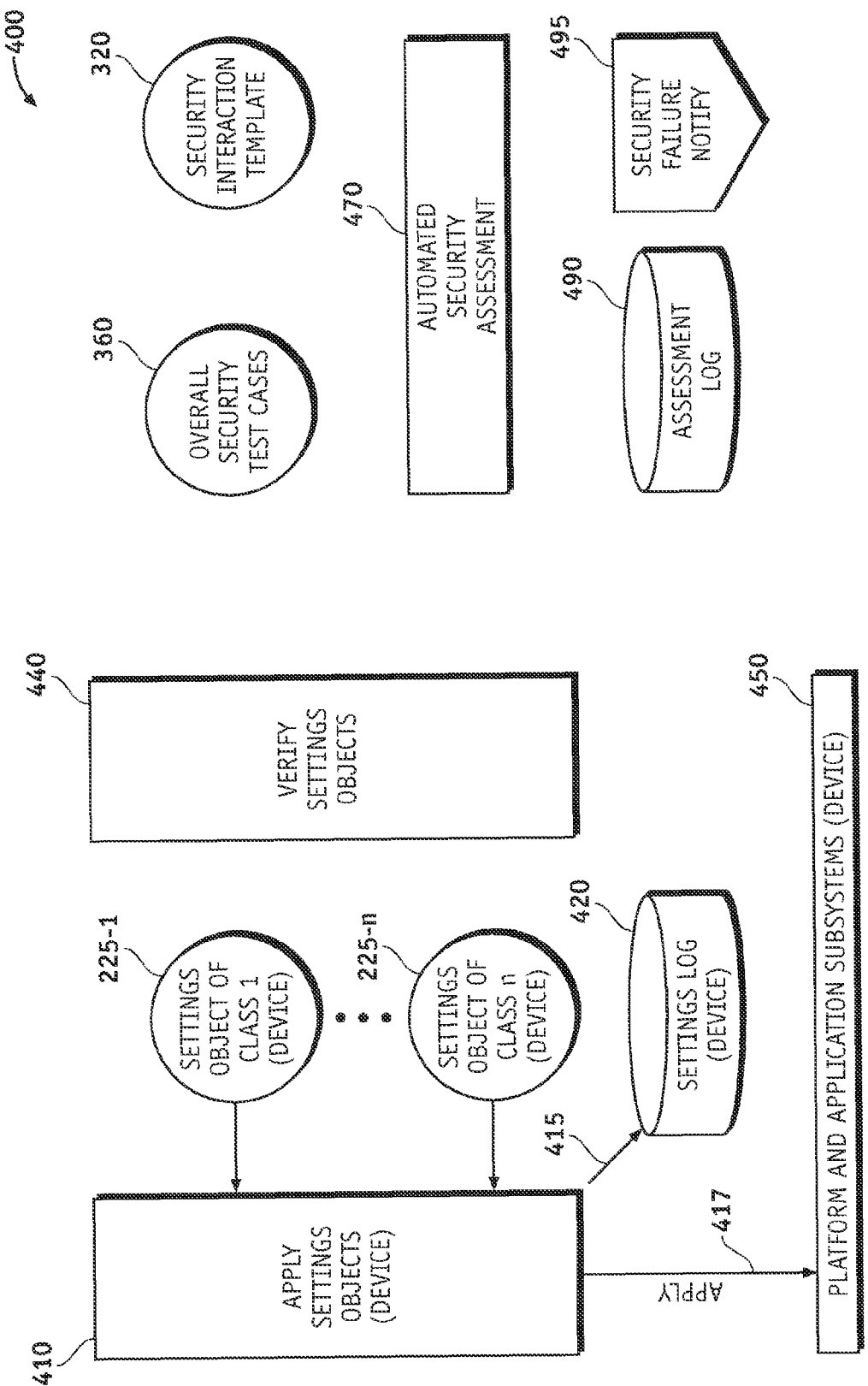
FIGS. 4A-4D are a series of block diagrams that illustrate an Automatic Security Compliance Assessment (ASCA) system implemented at a device and its operation in accordance with some of the disclosed embodiments.

However, as will be described below with reference to FIGS. 4A-4C, in some cases only some of the Settings Objects 225-1 to 225-n are actually applied on a device and/or the actual security intended from those Settings Objects may not be realized on the device. To address the case where all the Settings Objects are not applied on the device, the HSE also includes rules for determining an actual ODSR when only a subset of the Settings Objects are applied. In this case some interactions would not be present. As will be explained below, to assess security of a device, the user of computer 130 makes a plan to have a certain degree of security based on an "expected" ODSR 350, and then measures conformance via an "actual" ODSR and a "verified" ODSR. The "actual" ODSR is assessed based on the Settings Objects actually applied, and the "verified" ODSR is determined based on the execution of the test cases. Thus, the SIT 320 can be used to produce (1) an "expected" ODSR 350 that the device would be expected to have if the complete set of Settings Objects 225-1 to 225-n are applied on a device, and (2) an "actual" ODSR based on the Settings Objects actually applied on a device. For instance, when the Security Interaction Template 320 generated in FIG. 3 is used in FIG. 4C, the actual ODSR is determined based on the Settings Objects actually applied on the device. If only some Settings Objects 225-1 to 225-n are applied on a device, only relevant tests should be run. In this case, the HSE defines which particular ones of the test cases are to be run to verify/measure the ACTUAL security based on the Settings Objects that are actually applied.

The expected ODSR 350 informs the user how good all of his security settings (taken across all of the security classes) are in combination taking into account the way in which a certain combination of security settings will interact. The expected ODSR 350 can be displayed on the computer 130 at block 370 so provide the user with a visual indication of the expected ODSR 350 that reflects the overall security rating 350 for the entire collection of Settings Objects 225-1 . . . 225-n if they were applied to the device 120. Thus, method 300 provides an easy way to automatically generate an expected ODSR 350. In addition, rolled-up security test cases 360 are automatically generated to identify all test cases that need to be run to verify the security of the collection of Settings Objects 225-1 . . . 225-n if and when they are applied to the device 120.

If the user finds the expected ODSR to be unacceptably low, then the user can change one or more of the Values of the Configurable Attributes of one or more of the Settings Objects 225-1 . . . 225-n and/or add or subtract Settings Objects to try and improve the expected ODSR. In one implementation, each time the user inputs (enters or selects) a new combination the Attributes and/or Options of one or more of the Settings Objects 225-1 . . . 225-n, a new Settings Object or Objects will be generated and this will change the expected ODSR 350 that is displayed. In another implementation, the user can change the Values of one or more Configurable Attributes for a given Settings Object and resave it under the same name. If this is done, the old Settings Object of that name is replaced by the new one and the Security Rating may change accordingly. Although not illustrated, the overall security rating 350 for the device is logged and stored in a settings log for future use. The settings log will be described below with reference to FIGS. 4A-4D.

Although FIGS. 2-3 together describe systems and methods for automatically assessing the expected ODSR for a collection of Settings Objects with respect to a particular device, it will be appreciated that the expected ODSR applies to all devices in an enterprise network. The expected ODSR determines the security that would be expected of the collection of Settings Objects if they were applied together on any device. This allows a network administrator to quickly and easily confirm whether all of the devices would be expected to meet some minimum security rating, and if not, quickly take action to alter any devices that are not expected to meet this minimum security rating.

Although not illustrated, the control server 110 can use this information to roll-up the security for all mobile devices at a site or region to get an overall rated security for that site or region. This overall rated security for that site or region can be compared to the rated security of one or more standard configurations to get the relative rated security of that site or region with respect to those standard configurations. When the enterprise has multiple sites or regions the control server can roll-up the rated security for all mobile devices in the Enterprise to get an overall rated security for that enterprise. The overall rated security for that enterprise can be compared to the rated security of one or more standard configurations to get the relative rated security of that enterprise with respect to those standard configurations. In addition, ODSRs of collections of Settings Objects can provide a way to define "standard configurations." By comparing actual or verified ODSRs to the expected ODSRs of various pre-defined collections of Settings Objects, one can easily compare one collection of Settings Objects to other combinations or collections of Settings Objects that have been previously identified.

As noted above, at Block 310, the HSE evaluates the particular set of Settings Objects 225-1 . . . 225-n of various Settings Classes and their corresponding security rating templates to generate a corresponding security interaction template 320 and corresponding security test scripts 330. Different ways that the HSE can perform this evaluation will now be described.

To evaluate the security inter-relationships between each possible combination of Settings Objects 225-1 . . . 225-n, the HSE needs to be fully aware of all security implications of the Settings Objects 225-1 to 225-n for each of the Settings Classes and the SRT for each so that he can reasonably evaluate how the domains of those Settings Classes potentially overlap and the impact of any such overlap on overall security given the interactions between them. The HSE describes these relationships in the Security Interaction Template (SIT) 320 such that a user of this template can determine how to generate an expected ODSR.

Creating an SIT Based on a Set of Settings Classes

In one embodiment, the HSE creates the SIT 320 by evaluating a set of Settings Classes and determining the interactions for that particular set of Settings Classes. When implemented this embodiment would allow the resulting SIT to be used by those with little expert knowledge. This embodiment works well when the set of Settings Classes is small and/or when the Settings Classes themselves do not have complex interactions. For example, the relationship between a VPN Settings Object and a WWAN Settings Object is pretty straight-forward in that the VPN adds encryption, thus increasing the security of the combined solution. The specific choices made in the WWAN Settings Object are likely of little concern. The specific choices made in the VPN Settings are likely of concern since they will have the main impact on the actual security.

For sets of complex Settings Classes with complex interactions, the number of possible combinations and the resultant impact on combined security can be very large. Since each Settings Class could potentially result in a large number of possible Settings Objects, defining the interactions between all possible Settings Objects of one Settings Class and all possible Settings Objects of another Settings Class could be an enormous task. This could be exceedingly complex since it would require the HSE to account for all the potential interactions amongst all the Options for all the Attributes for all the Settings Classes.

Creating an SIT Based on a Set of Settings Objects

In another embodiment, the HSE creates the SIT 320 by evaluating different individual sets of Settings Objects. In this embodiment, the HSE can assess combinations of common Settings Objects that are frequently used, and the interactions for these particular combinations of Settings Objects. For instance, the HSE can select a group/subset of all possible settings objects (e.g., those that are most often selected by the user or of significance to security) and generate the SITs for that group/subset of all possible settings objects. This embodiment is easier to implement since the number of possible combinations to analyze for set of Settings Objects and the interactions between particular Objects is relatively small and not as complex in comparison to sets of Settings Classes.

In one implementation of this embodiment, the HSE can identify "does not matter" Attributes that do not affect security in any meaningful way during a combination of Settings Objects. For instance, the HSE can define that the Values of certain Attributes do not affect the interactions between Settings Objects in any meaningful way. When a SIT is defined by an HSE, it can be reused when used Settings Objects are not identical but differ only in the Values of "does not matter" attributes. If this is done, then the SIT can be used more widely as long as the same selections are made for the Attributes that do matter. In the extreme case, where nothing about a Settings Object impacts or alters security when combined with other Settings Objects, then every attribute in that Settings Object could be defined as "does not matter." In such a case, any Settings Object of the same Settings Class could be used with the same SIT, which is basically the same as if it was operating with a Settings Class instead of a Settings Object.

In another implementation of this embodiment, when the HSE assesses a selected set of Settings Objects, can make assumptions that some or all of the Settings Objects might actually be present. The HSE can assess collections of Settings Objects that may include Settings Objects that may not get used. The HSE considers the additive and relational impact of each Settings Object on the overall security, but would only has to consider the actual Options and Attributes selected within the set of specified Settings Objects. A user can then select a SIT that includes all the Settings Objects he is using even if it includes Settings Objects he is not using, and that SIT would still contain the information needed to assess the interactions between the Settings Objects that are being used. Any information contained in the SIT about interactions with Settings Objects the user is not using can simply be ignored. This approach adds value because it cuts down on the number of combinations and avoids having to create a SIT for every subset of a given set of Settings Objects. This approach is especially valuable if the same set of Settings Objects will eventually be deployed to many devices but for one or more reasons not all of the Settings Objects will necessarily be applied on a given device. By having one SIT for a given set of Settings Objects, the device can compute its security based on the subset of that set that it actually has deployed at a given time.

FIGS. 4A-4D are a series of block diagrams that illustrates an Automatic Security Compliance Assessment (ASCA) system 400 implemented in a device 120 and its operation in accordance with some of the disclosed embodiments.

The system 400 includes a Settings Objects application module 410, a settings log 420, a Settings Objects verification module 440, platform and application subsystems 450, an automated security assessment module 470 and a security assessment log 490. In one implementation, modules 410, 440, 470 are executable code that might be deployed as part of a single or multiple Control Modules, depending on how the functionality is partitioned for deployment.

In one implementation, each of these modules are executed and implemented at the device 120; however information maintained in logs 420, 490 can also be stored in memory at the control server 110 by providing updates from the device 120. Although not illustrated, the modules and logs of the system 400 are communicatively coupled to one another using any techniques known in the art.

The set of Settings Objects 225-1 ... 225-n having an expected overall device security rating (ODSR) 350, the particular security interaction template 320 and the overall security test cases 360 are generated using the systems and processing described above with respect to FIGS. 2 and 3, and are deployed to the device 120. It is assumed that the set of Settings Objects 225-1 ... 225-n have an expected ODSR 350 that has been determined to be acceptable by the user of computer 130. The device 120 can use the SIT 320 to calculate an Actual ODSR based on the Settings Objects that are actually applied on the device 120. If the Actual ODSR is sent to the control server, it can be compared with the expected ODSR 350 to see how well actual security of the device 120 compares to the expected security.

In one implementation, when a user of computer 130 has created a set of Settings Objects 225-1 ... 225-n to configure a device 120 and has obtained a Security Interaction Template (SIT) 320 for that set of Settings Objects 225-1 ... 225-n, the user can select that SIT 320 as an Option for an Attribute of a Settings Object of the Settings Class defined for the "Automated Security Assessment" Control Module 470. Similarly the Security Test Cases 360 can also be specified as Options/Values for Attributes of the same Settings Object. The Security Test Cases 360 can be script that could be specified and executed by interpretation or could be selectors of code functions embedded within the "Automated Security Assessment" Control Module 470. In either case, when the "Automated Security Assessment" Control Module 470 Package is deployed to the device and then configured by deploying a "Automated Security Assessment" Settings Package to the device, and the device will begin performing features of the "Automated Security Assessment" 470 as requested. The results of the ongoing operating of the "Automated Security Assessment" Control Module 470 can be logged on the device 120 and periodically uploaded to the control server 110 as is commonly the case for other Control Modules.

Operation of the system 400 will now be described with reference to FIGS. 4A-4D.

As described above each Settings Object configures a particular one of the platform and application subsystems 450. As illustrated in FIG. 4A, when the Settings Objects application module 410 receives the set of Settings Objects 225-1 ... 225-n (as indicated by arrow 417), it applies them to the platform and application subsystems 450 in an appropriate order to configure the device 120. Here the term "appropriate order," is used to acknowledge that due to the nature of the relationship between for the subsystems configured by each of the Settings Objects 225-1 . . . 225-n, it can be necessary to apply the of Settings Objects 225-1 . . . 225-n in a certain order for them to be effective since a change in one of subsystem may impact the other device subsystems.

As indicated by arrow 415, the Settings Objects application module 410 also creates and sends a record to the settings log 420 that specifies this particular set of Settings Objects 225-1 . . . 225-n and a time which indicates when they were applied to the platform and application subsystems 450. This record can also include information regarding whether the application of the Settings Object was successful since it is possible that some Settings Objects in a set might be successfully applied and others not. This information can be used, for example, to determine why the actual ODSR turns out to be different from the expected ODSR if that is the case in a particular situation. The settings log 420 stores the record to create a historical record of the current Setting Objects that are applied to the platform and application subsystems 450 (as represented by the set/collection of Settings Objects 225-1 . . . 225-n) and when they were applied to the platform and application subsystems 450. In one implementation, to eliminate the need to all of the Values of all the Configurable Attributes, a version number for the Settings Object can be stored to help distinguish versions resulting from changes made over time.

Over time, the settings log 420 maintains a history (or log) of changes regarding which Settings Objects are applied to the platform and application subsystems 450 of the device 120. The processing in FIG. 4A is performed each time a new set of Settings Objects are deployed to device 120 and applied to the platform and application subsystems 450 of the device 120 so that there is a record of all changes made in the Settings Objects that are applied to the platform and application subsystems 450. This way, the settings log 415 maintains a history of changes made that can affect the actual overall device security rating as a result of these changes.

Figure 4B:
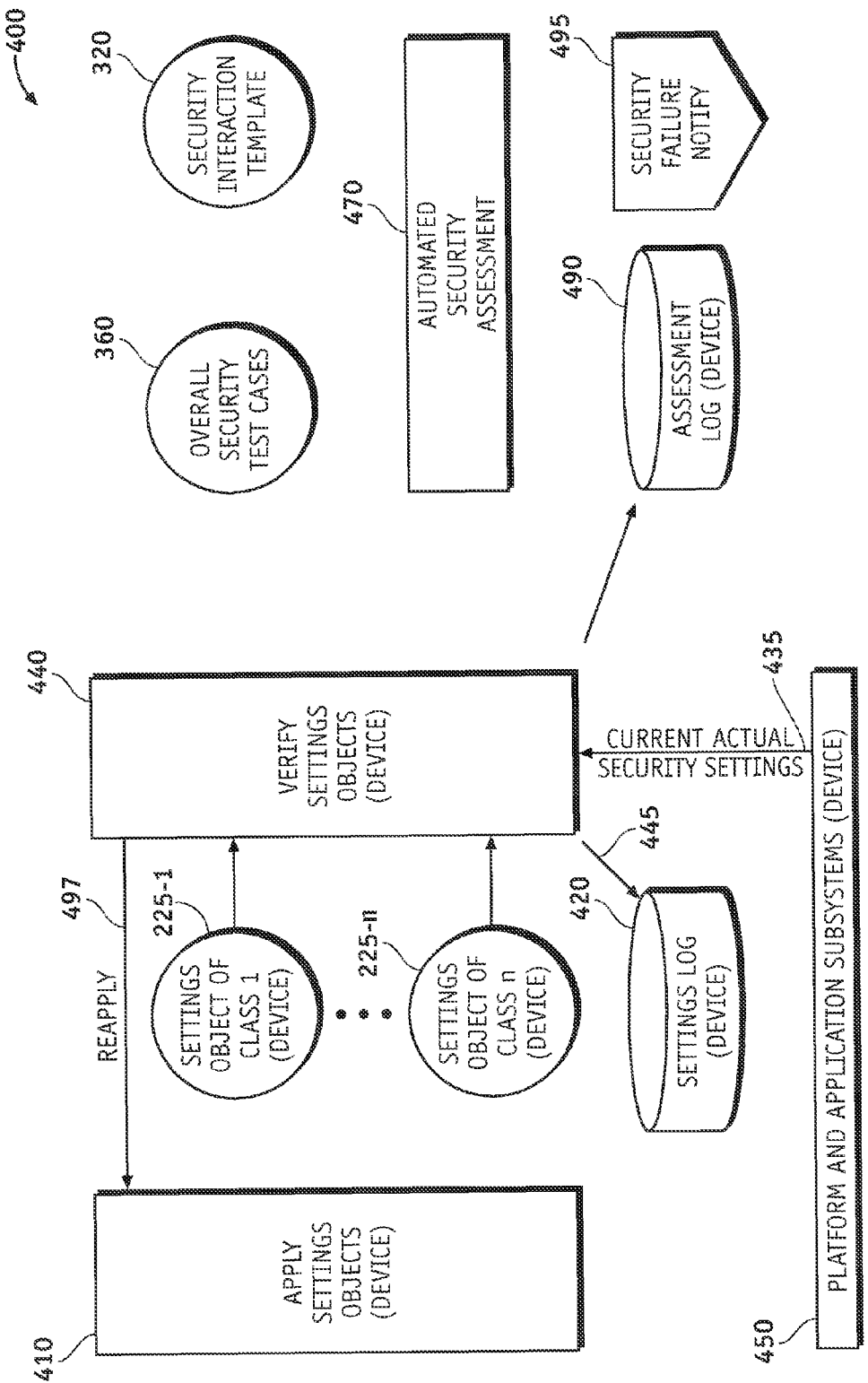

As illustrated in FIG. 4B, the Settings Objects verification module 440 also receives the particular set of Settings Objects 225-1 . . . 225-n and regularly (e.g., periodically) queries the platform and application subsystems 450 of the device 120 to determine if they remain configured as required. To "verify" the Settings Objects, the Settings Objects verification module 440 sends a request (not shown) to the platform and application subsystems 450 for its current actual Configurable Attributes and corresponding Values for each (i.e., those that are actually set on the platform and application subsystems 450).

The Settings Objects verification module 440 then compares the actual Configurable Attributes and corresponding Values that are actually applied to the platform and application subsystems 450 to those specified by the particular set of Settings Objects 225-1 . . . 225-n, and confirms whether the actual Configurable Attributes and corresponding Values actually applied on the platform and application subsystems 450 are configured as required by the particular set of Settings Objects 225-1 . . . 225-n.

The results of this comparison can be referred to as "configuration verification results," and are stored in the settings log 420 for future reference. In one implementation, the verification module 440 creates or updates a configuration verification results record in the settings log 420 to indicate the particular set of Settings Objects 225-1 . . . 225-n it received and an indication of whether the Attributes and corresponding Values specified by the set of Settings Objects 225-1 . . . 225-n match the actual Configurable Attributes and corresponding Values that are actually configured on the platform and application subsystems 450. If the configuration of a given subsystem on a device changes from what the intended configuration, this change can be detected by determining that the configuration previously applied via a Settings Object no longer matches the actual configuration of the subsystem. Detecting this type of "out of band" change can be of great interest from a diagnostic and forensic point of view, and also provides the potential to automatically reapply the Settings Object to repair and restore the desired configuration of that subsystem.

If the Settings Objects verification module 440 determines that the actual Configurable Attributes and corresponding Values configured on any one of the platform and application subsystems 450 do not match those specified by particular set of Settings Objects 225-1 . . . 225-n (and hence that the actual Configurable Attributes and corresponding Values are not configured as required by the particular set of Settings Objects 225-1 . . . 225-n), then the Settings Objects verification module 440 can issue a reapply command 497 to the Settings Objects application module 410, and the misconfiguration can be logged in the assessment log 490. The reapply command 497 initiates reapplication of the particular set of Settings Objects 225-1 . . . 225-n to the platform and application subsystems 450 to make sure that the actual Configurable Attributes and corresponding Values that are set on each of the platform and application subsystems 450 are correct (i.e., match those specified by the particular set of Settings Objects 225-1 . . . 225-n). The Attributes (and corresponding Values for each) can be reapplied in a predetermined order that is known to be reliable. In some scenarios this may require the removal or replacement of existing configurations or software and/or the deployment of new configurations or software. This process of reapplying Settings Objects can generally referred to as remediation and are described, for example, in U.S. patent application Ser. No. 12/263,265, titled "METHODS AND APPARATUS FOR MOBILE UNITS WITH LOCAL ACTION AND REMEDIATION," which is incorporated by reference herein in its entirety.

Figure 4C:
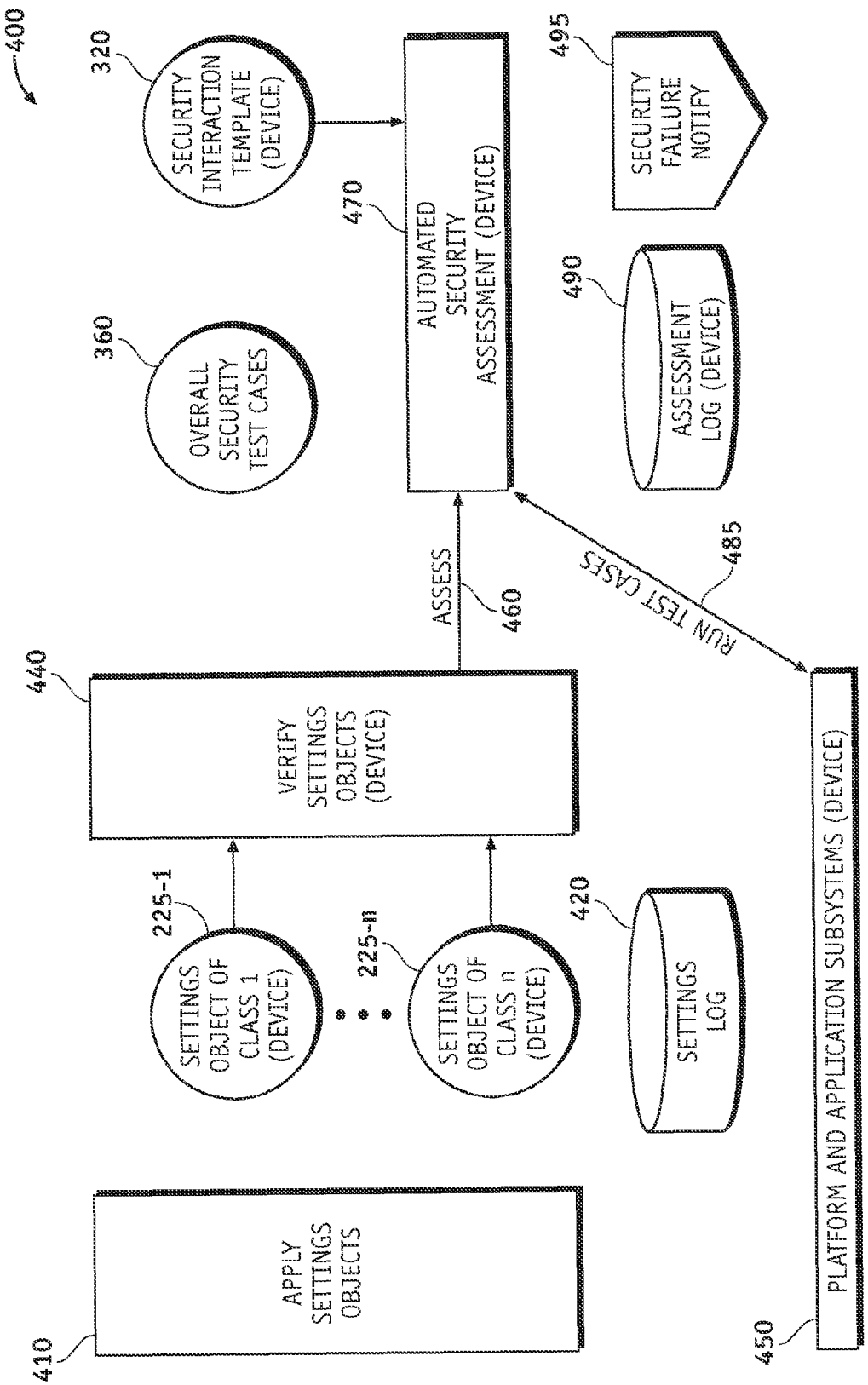

If the Settings Objects verification module 440 determines or "verifies" that the actual Configurable Attributes (and corresponding Values for each) that are actually set on the platform and application subsystems 450 do match the Attributes and corresponding Values specified by the particular set of Settings Objects 225-1 . . . 225-n, then the Settings Objects verification module 440 sends a begin security assessment command 460 to the automated security assessment module 470 and the system enters an assessment phase as will be described with reference to FIG. 4C, in which test cases are run to determine a verified ODSR, as described above.

When the automated security assessment block 470 receives the begin security assessment command 460, the automated security assessment module 470 runs the overall security test cases 360 as indicated by arrow 485.

As described above, the overall security test cases 360 correspond to the set of Settings Objects 225-1 . . . 225-n and the class security interaction template 320 that were determined in FIG. 3. When the entire set of Settings Objects 225-1 . . . 225-n are actually applied to the platform and application subsystems 450, this should ideally result in an ODSR 350 that is expected. However, in some cases only some of the Settings Objects 225-1 to 225-n are actually applied on a device and/or the actual security intended from those Settings Objects may not be realized on the device. The class security interaction template 320 allows the Verified ODSR to be computed in the device based on the actual Settings Objects present in and currently applied to the device.

To address the case where all the Settings Objects are not applied on the device, the HSE also includes rules in the SIT 320 for determining an actual ODSR when only a subset of the Settings Objects are applied. In this case some interactions would not be present. To assess actual overall security of a device, the conformance with the "expected"ODSR 350 is measured via an "actual" ODSR and a "verified" ODSR. The "actual" ODSR is assessed based on the Settings Objects actually applied as described above, whereas the "verified" ODSR is determined based on the execution of the test cases 360, 385. Notably, the process of running test cases (specified in the SIT) on the wireless computing device to determine a verified ODSR (that reflects the actual security of that wireless computing device during use) can consume device resources. As such, in some situations the actual ODSR is computed on a much more frequent basis than is the verified ODSR (e.g., the computation of the verified ODSR can be computed once every n times the actual ODSR is computed so long as the "actual ODSR" is above a threshold). In addition, if the "actual ODSR" is below a threshold, then it is unnecessary to compute the "verified ODSR" since it will most likely be inadequate, in which case it may be prudent to reset or reapply certain settings, or require changes to existing settings.

Thus, the SIT 320 can be used to determine an "actual" ODSR based on the Settings Objects actually applied on a device. For instance, when the SIT 320 generated in FIG. 4 is used in FIG. 4C, the actual ODSR is determined based on the Settings Objects actually applied on the device. If only some Settings Objects 225-1 to 225-n are applied on a device, only relevant tests should be run. In this case, the HSE defines which particular ones of the test cases are to be run to verify/measure the actual security based on the Settings Objects that are actually applied Thus, depending on the Settings Objects actually applied on the platform and application subsystems 450, test cases are run to compute a Verified ODSR and determine if the requisite security is met (i.e., to determine if the actual security is performing as desired or expected). The automated security assessment block 470 assesses the current actual security of the device 120 based on at least some of the overall security test cases 360 and the actual Configurable Attributes (and corresponding Values) that are currently applied on that device 120. In particular, the automated security assessment module 470 executes the overall security test cases 360 on the platform and application subsystems 450 to determine if the requisite security is met, and records results (e.g., pass assessment or fail assessment) as "security assessment results" along with an indication of when the assessment took place. In one embodiment, the security assessment results generated by the automated security assessment module 470 can include an actual ODSR and a verified ODSR, and the automated security assessment module 470 can compare the verified ODSR to the expected ODSR 350 (that was determined in FIG. 4) to determine if the actual ODSR is acceptable (i.e., pass assessment) or is unacceptable (i.e., fail assessment). In another embodiment, the security assessment results generated by the automated security assessment module 470 can indicate whether the platform and application subsystems 450 passed each of the overall security test cases (i.e., pass assessment) or failed one or more of the overall security test cases that were run (i.e., fail assessment). In yet another embodiment, the verified ODSR generated by the automated security assessment module 470 can be directly compared to the actual ODSR computed from the SIT. This would provide an easy comparison to see how well the verified/measured security achieves the actual ODSR (i.e., the predicted security). In other embodiments any combination of these approaches can be used.

The automated security assessment module 470 then stores the security assessment results in the assessment log 490 for future reference with an indication of when the assessment was run. Over time the security assessment log 490 maintains a history (log) of consequent changes in the rated and measured security of the device over time as a result of changes to the Attributes and corresponding Values applied to each of the platform and application subsystems 450 of the device 120.

Figure 4D:
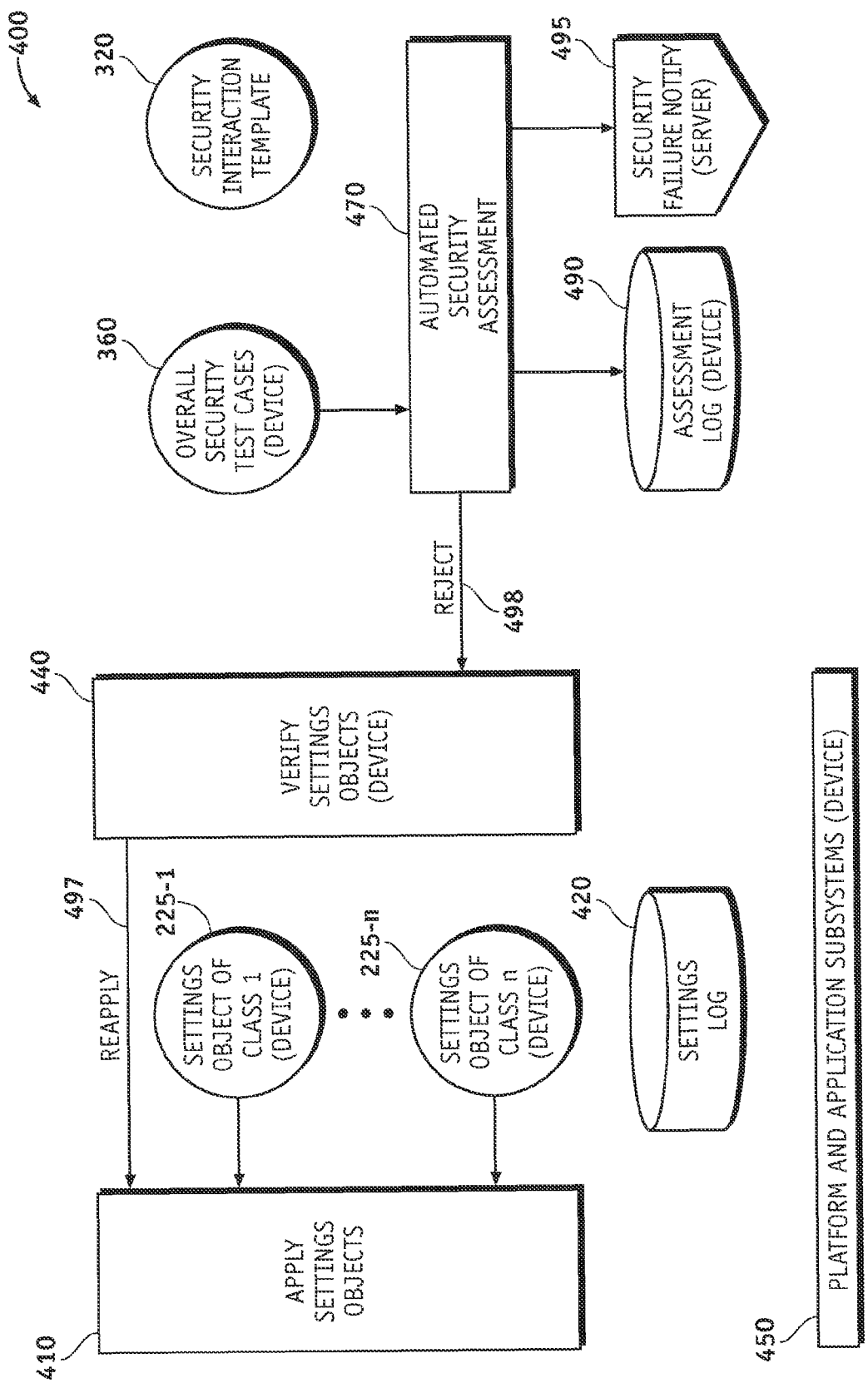

As illustrated in FIG. 4D, in accordance with one embodiment, when the device's platform and application subsystems 450 fail any of the test cases or do not meet an expected ODSR 350 or the verified/measured ODSR is comparatively low relative to expected ODSR 350 (i.e., security was "not good enough"), the device fails security assessment (i.e., the device does not meet the requisite security). The automated security assessment module 470 can then issue a rejection indicator 498 to the Settings Objects verification module 440 so that the set of Settings Objects 225-1 . . . 225-n can be re-compared (as indicated by arrow 435 of FIG. 4B) and/or re-applied (as indicated by arrow 497) as appropriate. The automated security assessment module 470 can also generate a security failure notification 495 for a user (such as the user of the computer 130 and/or network administrator who monitors server 110 and/or user of the device 120). In one embodiment, the security failure notification 495 indicates to the user that the actual Configurable Attributes and corresponding Values being applied to the device's platform and application subsystems 450 are inadequate and do not meet security policies and standards of the enterprise.

In response to the command 497 the one or more of the Attributes and/or corresponding Values for one or more of the Attributes can be adjusted to generate a new set of Settings Objects 225-1 . . . 225-n and/or new Settings Objects can be created. When the one or more of the device's Attributes and/or corresponding Values for one or more of the Attributes are adjusted and/or new Settings Objects can be created, a new set of Settings Objects 225-1 . . . 225-n are generated in accordance with FIGS. 3 and 4. In response to this new set of Settings Objects 225-1 . . . 225-n, the device 120, which can then repeat the processing described above with reference to FIGS. 4A-4D until the automated security assessment module 470 determines that the device passed its security assessment.

The processing described above with reference to FIGS. 4A-4D can be re-performed on a regular basis or on-demand to assess security of the device and ensure that it remains in compliance with security policies and standards of the enterprise.

Each time the processing described above with reference to FIGS. 4A-4D is re-performed records in the settings log 420 and the security assessment log 490 for that device are updated with new information to create a historical record of the "settings" applied to that device and the device's compliance (or non-compliance) with security policies and standards of the enterprise. When the system 400 is used to manage all of the enterprise's mobile computing devices, a significant burden is removed from the network administrator(s) or IT staff of the enterprise.

Exemplary Implementations of the Disclosed Embodiments

To help illustrate how the systems and methods described above could be implemented, two example use cases will now be described.

Payment Card Industry (PCI) Compliance Audit Preparation

Consider a mobile point-of-sale system deployed to enable check-in of guests from the parking lot of hotel, in which a mobile hospitality worker greets a customer upon entry to the parking lot. Using a WLAN-enabled mobile device, the worker swipes the customer's credit and loyalty cards, issues room keys, and directs the customer to the most convenient parking.

Since this system deals with sensitive payment card information, it will need to be validated as PCI compliant via a PCI audit. Since the system involves the use of a mobile device on a wireless network and since sensitive payment card information must actually be sent over the wireless network, the operation of the mobile device, mobile application, and wireless network will likely all be subjected to intense scrutiny during an audit.

Before scheduling a PCI audit the enterprise will likely want to ascertain that they are compliant and hence will likely pass the audit. This might be accomplished by: selecting one or more "stock" predefined standard configurations that represent PCI compliance guidelines, and assessing all devices in the enterprise (or a selected domain within the enterprise) and comparing their current rated security to the rated security of the selected standard configurations.

If the comparison shows that the rated security of all devices meets or exceeds PCI guidelines, then the human security expert can create one or more standard configurations from the actual configurations detected for mobile devices, create policies to enforce these standard configurations to all current mobile devices on an ongoing basis, create policies to apply these standard configurations to all new mobile devices, and establish ongoing monitoring of all mobile devices to detect, repair, and notify about compliance to (and deviations from) these standard configurations.

Reports will also be prepared to show evidence to the auditor that standard configurations are enforced on all devices, the standard configurations comply with PCI guidelines, and the history for a suitable period shows no lapses in the continuous compliance to enforced standard configurations.

If the comparison shows that the rated security of any devices fails to meet PCI guidelines, then it is easy to identify the devices that fail to meet PCI guidelines, determine the sets of configuration changes that would be required to make these devices meet PCI guidelines, create one or more standard configurations that incorporate the changes necessary to make them comply with PCI guidelines, create policies to enforce these new standard configurations to all identified mobile devices on an ongoing basis, and repeat the assessment of the Enterprise or domain.

The end goal of the above process would be to achieve a high degree of confidence that the system does comply with PCI guidelines and to collect the evidence necessary to clearly demonstrate that compliance to a PCI auditor.

Design, Development, Deployment, Validation and Monitoring of a New Mobilization Solution Consider a mobile auto detailing business that wants to deploy a new mobilization solution that will allow a worker to use a WWAN-enabled mobile device to collect customer and vehicle information, take "before" photos, generate and print quote for a detailing service, schedule a time to perform the detailing service, take "after" photos, accept payment information, including customer signature, and print a receipt to record the transaction Since this solution deals with sensitive payment card information, it will need to be validated as PCI compliant via a PCI audit. Since the solution involves the use of a mobile device on a wireless network and since sensitive payment card information must actually be sent over the wireless network, the operation of the mobile device, mobile application, and wireless network will likely all be subjected to intense scrutiny during an audit. To ensure that the solution has a high likelihood of complying with PCI guidelines, the system architect may: create several potential standard configurations based on information provided by potential mobile device vendors and/or wireless service providers, assess the rated security of these new standard configurations against one or more "stock" predefined standard configurations that represent PCI guidelines, and select devices and service plans that can be configured to conform to standard configurations that will meet comply with PCI guidelines. As design and development of the solution proceeds, designer and developers may: introduce changes to the standard configurations to meet the needs of evolving application requirements or changes in underlying environmental assumptions, and reassess the rated security of modified standard configurations to spot any issues that could threaten failure to comply to PCI guidelines.

As the system is being validated, quality assurance associates may assess the compliance of all devices against the standard configurations identified in the design, assess the rated security of all devices against both the standard configurations identified in the design and against one or more "stock" predefined standard configurations that represent PCI guidelines, and express an opinion as to whether the solution seems to comply with PCI guidelines.

When the system is being rolled-out, operations associates may create policies to apply the standard configurations identified in the design to all new mobile devices, create policies to enforce the standard configurations identified in the design to all mobile devices, and/or establish ongoing monitoring of all mobile devices to detect, repair, and notify about compliance to and deviations from the standard configurations identified in the design.

Those of skill will appreciate that the various illustrative logical blocks, modules, circuits, and steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. As used herein the term "module" refers to a device, a circuit, an electrical component, and/or a software based component for performing a task. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the connecting lines or arrows shown in the various figures contained herein are intended to represent example functional relationships and/or couplings between the various elements. Many alternative or additional functional relationships or couplings may be present in a practical embodiment.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to"used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
   at a control server:
   storing one security rating template for each particular Settings Class of a plurality of different Settings Classes for a first wireless computing device, wherein each security rating template comprises information specified by a security expert for determining an expected security rating for any Settings Objects created in accordance with a particular Settings Class;
   generating, based on Values input by a user for a plurality of Configurable Attributes, a first Settings Object for a first particular Settings Class, wherein the first Settings Object defines a particular configuration of a first subsystem of the first wireless computing device, and a plurality of other Settings Objects for Settings Classes of the plurality of different Settings Classes, wherein each of the other Settings Objects correspond to one of the Settings Classes and define particular configurations of subsystems of the first wireless computing device;
   using a particular security rating template corresponding to the first particular Settings Class to generate a first expected security rating corresponding to the first Settings Object, and for each of the other Settings Objects, using a particular security rating template corresponding to a particular Settings Class to generate expected security ratings corresponding to each of the other Settings Objects;
   evaluating, by a security expert, a particular group of Settings Objects generated by the user for the first wireless computing device and the corresponding Security Rating Templates for each one of the particular group of Settings Objects, to determine the security inter-relationships between the configurations of subsystems defined by the Settings Objects in the particular group of Settings Objects;
   creating, based on the evaluation of the security expert, a security interaction template (SIT) and security test scripts that correspond to the particular group of Settings Objects, wherein the SIT describes how to produce a first expected overall device security rating (ODSR) for the particular group of Settings Objects;
   generating, based on the security interaction template and security rating templates, a first expected ODSR that represents an aggregate security expected of the first wireless computing device if the particular group of Settings Objects are actually deployed and applied as a group to the first wireless computing device, taking into account individual security ratings of the Settings Objects applied and interactions between the Settings Objects applied; and
   generating, based on the security test scripts, a set of overall security test cases that are to be run on subsystems of the first wireless computing device to measure an actual aggregate security of the first wireless computing device under conditions when the particular group of Settings Objects are actually deployed and applied as a group to the first wireless computing device.

2. A method according to claim 1, wherein the first wireless computing device comprises:
a number of subsystems, wherein each particular subsystem is configurable by applying a Settings Object created in accordance with a particular one of the Settings Classes corresponding to that particular subsystem.

3. A method according to claim 2, wherein each Settings Class defines:
a plurality of Configurable Attributes that are used to configure a particular subsystem of the first wireless computing device; and
one or more Options controlling the Values that will be allowed to be entered or are required to be entered by a user for each Configurable Attribute.

4. A method according to claim 3, wherein each Settings Object comprises:
a particular combination of Values of Configurable Attributes entered by the user and/or selected by the user from amongst potential Values defined in the Options defined in the Settings Class and used to specify a configuration for configuring a particular subsystem corresponding to a particular Settings Class.

5. A method according to claim 2, wherein the Values specified for each of the plurality of Configurable Attributes in each Settings Object collectively define a different configuration for the particular subsystem associated with a particular Setting Class used to guide the creation of that Settings Object.

6. A method according to claim 5, wherein each Settings Object defines a specific configuration of a particular platform-related or application-related subsystem of the first wireless computing device.

7. A method according to claim 1, further comprising:
displaying the expected security rating on a display of the computer to provide the user with feedback regarding security that would result if that particular Settings Object were applied to configure a particular subsystem on the first wireless computing device.

8. A method according to claim 1, further comprising:
storing the expected security rating along with a time to indicate when the expected security rating was generated.

9. A method according to claim 1, wherein the security test scripts correspond to the security interaction template and are generated by the security expert to identify the set of security test cases to be run on the device to measure the expected overall security if the particular group of Settings Objects are actually deployed and applied as a group to the first wireless computing device.

10. A method according to claim 1, wherein the first expected ODSR is an aggregate rating that is determined based on the individual security ratings of the particular group of Settings Objects when actually deployed and applied as a group to the first wireless computing device, using the security interaction template and taking into account security impacts of the applied Settings Objects when interacting together, wherein the first expected ODSR reflects the resultant overall device security that a particular combination of the Settings Objects would be expected to provide when the subsystems of the device are configured in accordance with the particular group of Settings Objects.

11. A method according to claim 1, further comprising:
displaying the first expected ODSR.

12. A method according to claim 11, further comprising:
storing the first expected ODSR along with a time to indicate when the first expected ODSR was generated.

13. A system, comprising:
a computer;
a server in communication with the computer and being designed to: store one security rating template for each particular Settings Class of a plurality of different Settings Classes for a first wireless computing device, wherein each security rating template comprises information specified by a security expert for determining an expected security rating for any Settings Objects created in accordance with a particular Settings Class;
generate, based on Values input by a user for a plurality of Configurable Attributes, a first Settings Object for a first particular Settings Class, wherein the first Settings Object defines a particular configuration of a first subsystem of the first wireless computing device, and a plurality of other Settings Objects for Settings Classes of the plurality of different Settings Classes, wherein each of the other Settings Objects correspond to one of the Settings Classes and define particular configurations of subsystems of the first wireless computing device;
use a particular security rating template corresponding to the first particular Settings Class to generate a first expected security rating corresponding to the first Settings Object, and for each of the other Settings Objects, use a particular security rating template corresponding to a particular Settings Class to generate expected security ratings corresponding to each of the other Settings Objects;
evaluate, by a security expert, a particular group of Settings Objects generated by the user for the first wireless computing device and the corresponding Security Rating Templates for each one of the particular group of Settings Objects, to determine the security inter-relationships between the configurations of subsystems defined by the Settings Objects in the particular group of Settings Objects;
create, based on the evaluation of the security expert, a security interaction template (SIT) and security test scripts that correspond to the particular group of Settings Objects, wherein the SIT describes how to produce a first expected overall device security rating (ODSR) for the particular group of Settings Objects;
generate, based on the security interaction template and security rating templates, a first expected ODSR that represents an aggregate security expected of the first wireless computing device if the particular group of Settings Objects are actually deployed and applied as a group to the first wireless computing device, taking into account individual security ratings of the Settings Objects applied and interactions between the Settings Objects applied; and generate, based on the security test scripts, a set of overall security test cases that are to be run on subsystems of the first wireless computing device to measure an actual aggregate security of the first wireless computing device under conditions when the particular group of Settings Objects are actually deployed and applied as a group to the first wireless computing device.

14. A system according to claim 13, wherein the first wireless computing device comprises:
a number of subsystems, wherein each particular subsystem is configurable by applying a Settings Object created in accordance with a particular one of the Settings Classes corresponding to that particular subsystem.

15. A system according to claim 14, wherein each Settings Class defines a plurality of Configurable Attributes that are used to configure a particular subsystem of the first wireless computing device; and one or more Options controlling the Values that will be allowed to be entered or are required to be entered by a user for each Configurable Attribute.

16. A system according to claim 15, wherein each Settings Object comprises:
   a particular combination of Values of Configurable Attributes entered by the user or selected by the user from amongst potential Values defined in the Options defined in the Settings Class and used to specify a configuration for configuring a particular subsystem corresponding to a particular Settings Class.

17. A system according to claim 14, wherein the Values specified for each of the plurality of Configurable Attributes in each Settings Object collectively define a different configuration for the particular subsystem associated with a particular Setting Class used to guide the creation of that Settings Object.

18. A system according to claim 17, wherein each Settings Object defines a specific configuration of a particular platform-related or application-related subsystem of the first wireless computing device.

* * * * *

UNITED STATES PATENT AND TRADEMARK OFFICE
CERTIFICATE OF CORRECTION

| | | |
|---|---|---|
| PATENT NO. | : 8,336,080 B2 | |
| APPLICATION NO. | : 12/492877 | |
| DATED | : December 18, 2012 | |
| INVENTOR(S) | : Herrod | |

It is certified that error appears in the above-identified patent and that said Letters Patent is hereby corrected as shown below:

In the Specifications:

In Column 4, Line 16, delete "have a determined" and insert -- have a plurality or set of Configurable Attributes. A Configurable Attribute can have a Value that is determined --, therefor.

In Column 11, Lines 25-36, delete "In many ...... Values." and insert the same at Line 26, as a new paragraph.

In Column 15, Lines 40-41, delete "others allow the" and insert -- others allow a Value to be entered at the discretion of the user. Some Configurable Attributes allow the --, therefor.

Signed and Sealed this
Thirtieth Day of April, 2013

Teresa Stanek Rea
*Acting Director of the United States Patent and Trademark Office*